(12) United States Patent
Frydman et al.

(10) Patent No.: US 9,894,552 B2
(45) Date of Patent: Feb. 13, 2018

(54) REGULATING DATA COMMUNICATION BETWEEN A MOBILE DATA CLIENT AND A REMOTE SERVER

(71) Applicant: SAGUNA NETWORKS LTD., Yokneam Illit (IL)

(72) Inventors: Daniel Nathan Frydman, Haifa (IL); Lior Fite, Zurit (IL)

(73) Assignee: SAGUNA NETWORKS LTD., Yokneam Illit (IL)

( * ) Notice: Subject to any disclaimer, the term of this patent is extended or adjusted under 35 U.S.C. 154(b) by 253 days.

(21) Appl. No.: 14/830,801

(22) Filed: Aug. 20, 2015

(65) Prior Publication Data
US 2016/0112904 A1 Apr. 21, 2016

Related U.S. Application Data

(60) Provisional application No. 62/066,377, filed on Oct. 21, 2014, provisional application No. 62/099,652, filed on Jan. 5, 2015.

(51) Int. Cl.
| | |
|---|---|
| *H04W 28/02* | (2009.01) |
| *H04L 1/22* | (2006.01) |
| *H04L 29/06* | (2006.01) |
| *H04L 5/00* | (2006.01) |
| *H04W 36/02* | (2009.01) |
| *H04L 29/08* | (2006.01) |
| *H04W 28/14* | (2009.01) |
| *H04L 12/893* | (2013.01) |
| *H04L 12/835* | (2013.01) |
| *H04W 84/00* | (2009.01) |

(52) U.S. Cl.
CPC ............ *H04W 28/02* (2013.01); *H04L 1/22* (2013.01); *H04L 5/0055* (2013.01); *H04L 47/40* (2013.01); *H04L 67/1002* (2013.01); *H04L 69/16* (2013.01); *H04W 28/14* (2013.01); *H04W 36/02* (2013.01); *H04L 47/30* (2013.01); *H04W 84/005* (2013.01)

(58) Field of Classification Search
CPC ... H04W 36/02; H04W 28/02; H04W 28/021; H04W 28/0226; H04W 28/0278; H04W 28/14; H04W 84/005; H04L 47/30; H04L 47/40; H04L 69/16; H04L 5/0055
See application file for complete search history.

(56) References Cited

U.S. PATENT DOCUMENTS

| | | | | |
|---|---|---|---|---|
| 6,876,639 | B1 * | 4/2005 | Cao | H04L 1/1607 370/331 |
| 2003/0149715 | A1 * | 8/2003 | Ruutu | H04L 29/06 718/100 |
| 2016/0094466 | A1 * | 3/2016 | Arvidsson | H04W 80/06 370/235 |

* cited by examiner

*Primary Examiner* — Joshua Kading
(74) *Attorney, Agent, or Firm* — Vladimir Sherman; Professional Patent Solutions Ltd.

(57) ABSTRACT

Disclosed are methods, circuits, apparatus, systems and functionally associated computer executable code for providing connectivity between a mobile communication device communicatively coupled to an access point of a mobile communication network and a remote server. According to some embodiments, there may be provided a data buffer at or in communicative proximity with the access point and which responds to receipt of data packets from the remote server with a packet receipt acknowledgement emulating a packet receipt acknowledgment of the mobile communication device.

39 Claims, 10 Drawing Sheets

REGULATING DATA COMMUNICATION BETWEEN A MOBILE DATA CLIENT AND A REMOTE SERVER

TECHNICAL FIELD

The present disclosure, in some examples thereof, relates to mobile communication networks.

BACKGROUND

When originally designed, the TCP protocol was aimed to run over networks supporting high bandwidth, short delays and limited congestions. Many networks today, in general, and specifically wireless networks, are in many cases not the optimal infrastructure to run TCP over. In many cases, wireless networks, and particularly mobile networks, are characterized by high losses due to radio propagation impairments, high delays, and limited bandwidth. Small scale degradations over the air interface, such as fast fading, induce fluctuations, and losses over the air interface are mistakenly taken as congestion over the fixed networks by TCP. Although radio link control mechanisms typically use retransmissions to achieve error free communications over the air interface, these radio retransmissions sometimes cause delays that are large compared to TCP timescales, resulting in degradation of end-to-end throughput through the network.

Often TCP based mechanisms misinterpret errors over wireless links as congestions and react by retransmitting TCP segments and by reducing the congestion window and thus the overall application throughput. The following factors affect the TCP performance in a wireless (and specifically mobile) network:

Limited bandwidth and long Round Trip Delay (RTD)—Limited bandwidth can lead to buffer overflow, packet lost and retransmissions. For example, during the start of service buffers in the server and terminal (the mobile data client) can overflow and packets are thus lost and are retransmitted. As this happens the congestion thresholds are set accordingly till the network becomes more stable and packet loss reduces dramatically. The long RTD is a built in problem in many networks, including mobile networks, as the source and destination TCP termination points are usually physically distant from each other.

High loss rate—Caused mainly by high error rate over the radio link. Although ARQ is sometimes implemented in the MAC layer, ensuring packets are received correctly, this may, and many times does in fact interfere with the TCP protocol. The ARQ mechanism will delay the traffic till a lost packet is received correctly, thus adding delay on the remaining packets which were received correctly, and in many cases, leading to TCP timeouts and retransmissions. The randomness and the bursty behavior of the errors over wireless links render the effect of packet losses even more harmful.

Mobility and Handoffs—In mobile networks, the mobility of the terminal brings with it changes in the network topology and in the radio link. This mobility and its effects are an additional contributor to the errors and lost packets thus reducing the TCP throughput. During handoffs, data stored in the buffers between the server and the terminal may be lost, leading to drastic degradations of overall TCP throughput. The term "handover" is used interchangeably with the with the term "handoff".

Asymmetric downlink and uplink bandwidth—Preserving symmetric bandwidth between both directions of the TCP link prevent delays on the acknowledgements. In many mobile networks, the uplink has much less bandwidth capacity compared to the downlink. This often leads to longer acknowledge times and degradation in TCP performance.

The characteristics of TCP and the behavior of many mobile networks lead to poor user experience. Measurement done across various types of mobile networks, show an average packet loss of 3-4% in both uplink and downlink. Measurements done over mobile networks show that during peak hour a degradation of up to 2 points in MOS (Mean Opinion Score) was detected. MOS 5 is considered as best possible quality. Assuming that even under best possible conditions the mobile content consumption experience (due to its frame size, frame rate and bit rate) would reach a MOS grade of 3.5-4, during peak hour this MOS grade would degrade to 1.5-2 which is defined as Bad to Annoying, and can eventually drives users to abandon the service.

In TCP traffic the user experience is affected by the time it takes the end application to present the requested content to the user. Packet loss and high jitter in the network cause the TCP stack on the remote server to retransmit packets, and eventually to narrow down the TCP sliding window leading to reduced throughput between the server and the terminal.

It is very hard to determine the exact degradation in user experience. Studies and measurements show a decrease of about 20-30% in throughput due to retransmissions and jitter delays during peak hour traffic.

SUMMARY

According to an aspect of the presently disclosed subject matter there is provided a mobile data network appliance for regulating data communication between a mobile data client communicatively coupled to an access point of the mobile data network and a remote server. According to some examples of the presently disclosed subject matter, the network appliance can include: a mobile data client interface, a remote server interface, a buffer storage and a controller. The mobile data client interface can be configured to communicatively couple the mobile data network appliance and the mobile data client. The remote server interface can be configured to communicatively couple the network appliance and the remote server. The controller can be configured to intercept, through the remote server link interface, TCP communications from the remote server destined for the mobile data client. The controller can be configured to store data from the intercepted TCP communications in the buffer storage and communicate to the remote server a receipt acknowledgement for corresponding intercepted TCP communications upon storing said respective data in the buffer. The controller can be configured to send buffered data to the mobile data client, and clear buffered data from the buffer storage for which a receipt According to examples of the presently disclosed subject matter, the controller can be configured to emulate a TCP connection between the remote server and the mobile data client including for intercepted TCP communications.

Optionally, the controller can be configured to send buffered data to the mobile data client asynchronously with receipt of a corresponding TCP communication from the remote server.

Optionally, the controller can be configured to send a receipt acknowledgement to the remote server in respect of communications which were successfully delivered to the mobile data client and which are associated with communications from the remote server to the mobile data client and that were intercepted by the network appliance.

Optionally, the controller can be configured to store data from the intercepted TCP communications in the buffer storage, as long as the buffer storage has sufficient space available for storing the data.

Optionally, the network appliance can include a local content source. The controller can configured to determine which content is or is to be communicated by the remote server to the mobile data client, and determine if the content is available on the local content source. In case the controller determines that the content is available on the local content storage, the controller can be configured to obtain the content from the local content source, and to communicate the content or cause the content to be communicated or from the local content source to the mobile data client. The controller can be further configured to communicate a receipt acknowledgement to the remote server in respect of content communicated from the local content source to the mobile data client after receipt thereof was acknowledged by the mobile data client.

Optionally, the appliance can include a local cache which can be configured to store content on the appliance, and wherein the local cache serves as a local content source.

Optionally, the appliance can include a local content server interface. The controller can be configured to determine that content that is or is to be communicated by the remote server to the mobile data client is available on the local content server, and in response to detecting that that content that is or is to be communicated by the remote server to the mobile data client is available on the local content server, the controller can be configured to utilize the local content server link interface to obtain the content from the local content server. The controller can be further configured to communicate the content from the local content server to the mobile data client, and to communicate a receipt acknowledgement to the remote server in respect of content communicated from the local content server to the mobile data client after receipt thereof was acknowledged by the mobile data client.

According to a further aspect of the presently disclosed subject matter, there is provided a mobile data network. According to examples of the presently disclosed subject matter, the mobile data network can include: a remote server, a mobile data client communicatively coupled to an access point of the mobile data network, and a network appliance communicatively couple to each of said remote server and mobile data client. The network appliance can configured to intercept TCP communications from the remote server destined for the mobile data client, temporarily store in a buffer data from intercepted TCP communications and communicate to the remote server a receipt acknowledgement for corresponding intercepted TCP communications upon locally buffering said respective data. The network appliance can be further configured to send locally buffered data to the mobile data client, and clear locally buffered data upon receiving a receipt acknowledgment form the mobile data client.

Optionally, the network can include a local content server. The network appliance can be configured determine which content is or is to be communicated by the remote server to the mobile data client and to determine if the content is available on the local content server. If the content is available on the local content server, the network appliance can be configured to obtain the content from the local content server, and to communicate the content or cause the content to be communicated from the local content server to the mobile data client. The network appliance can be further configured to communicate a receipt acknowledgement to the remote server in respect of content that was communicated from the local content server to the mobile data client after receipt thereof was acknowledged by the mobile data client.

Optionally, the network appliance can be configured to determine which content is or is to be communicated by the remote server to the mobile data client, and to determine if the content is available in a local content cache of the network appliance. If the content is available on the local content cache, the network appliance can be configured communicate the content or cause the content to be communicated from the local content cache to the mobile data client, and to communicate a receipt acknowledgement to the remote server in respect of content communicated from the local content cache to the mobile data client after receipt thereof was acknowledged by the mobile data client.

According to yet another aspect of the presently disclosed subject matter, there is provided method of regulating data communication between a mobile data client communicatively coupled to an access point of a mobile data network and a remote server. According to examples of the presently disclosed subject matter, the method can include: utilizing a network appliance communicatively coupled to remote server and mobile data client to intercept TCP communications from the remote server destined for the mobile data client; buffering, locally on the network appliance, data from intercepted TCP communications; communicating from the network appliance to the remote server a receipt acknowledgement for the intercepted TCP communications upon storing respective data on said network appliance; sending said locally buffered data from the network appliance to the mobile data client; and on said network appliance, clearing locally stored data for which a receipt acknowledgment was received form the mobile data client.

Optionally, the method can further include emulating a TCP connection between the remote server and the mobile data client including for intercepted TCP communications.

Optionally, sending the locally buffered data from the network appliance to the mobile data client can include sending buffered data to the mobile data client asynchronously with receipt of a corresponding TCP communication from the remote server.

Optionally, the method can further include: sending a receipt acknowledgement to the remote server in respect of communications which were successfully delivered to the mobile data client and which are associated with communications from the remote server to the mobile data client and that were intercepted by the network appliance.

Optionally, buffering can include retaining buffered data from the intercepted TCP communications in a buffer as long as the buffer has sufficient space available for storing the data.

Optionally the method can further include: determining which content is or is to be communicated by the remote server to the mobile data client; determining if the content is available on a local content source, and if yes, obtaining the content from the local content source; communicating the content from the local content source to the mobile data client, and communicating a receipt acknowledgement to the remote server in respect of content communicated from the local content source to the mobile data client after receipt thereof was acknowledged by the mobile data client.

According to a further aspect of the presently disclosed subject matter, there is provided a mobile data network comprising a mobile data client interface, a remote server interface, a local storage resource interface, a core agent interface and a controller. According to examples of the presently disclosed subject matter, the mobile data client interface can be configured to communicatively couple the mobile data network appliance and the mobile data client. The remote server interface can be configured to communicatively couple the network appliance and the remote server. The local storage resource interface can be configured to communicatively couple the network appliance and a local storage resource. The core agent interface can be configured to communicatively couple the network appliance and a core agent. The controller can be configured to: determine which content is or is to be communicated by the remote server to the mobile data client, communicate the content or cause the content to be communicated from a local content resource to the mobile data client, and communicate a receipt acknowledgement towards the remote server in respect of the content communicated from the local content resource to the mobile data client after receipt thereof was acknowledged by the mobile data client. The controller is further configured to communicate an indication towards to core agent that content associated with a certain TCP link between the remote server and the mobile data client is communicated to the mobile data client from a local content resource, and the controller is configured to detect a handoff of the mobile data client or loss of connection between the network appliance and the mobile data client, and communicate an indication towards to core agent that the handoff or the loss of connection.

Optionally, the controller can be configured to emulate a TCP connection between the remote server and the mobile data client including for content delivered from the local content resource.

Optionally, when the controller determines which content is or is to be communicated by the remote server to the mobile data client, the controller can be configured to: determine if the content is available on the local content source, and if yes, obtain the content from the local content source, and communicate the content or cause the content to be communicated from the local content source to the mobile data client.

Optionally the local storage resource is an integrated component of the network appliance.

In yet a further aspect of the presently disclosed subject matter, there if provided a mobile data network including a remote server, a mobile data client, a network appliance, a local storage resource and a core agent. According to examples of the presently disclosed subject matter, the mobile data client can be communicatively coupled to an access point of the mobile data network. The network appliance can be communicatively coupled to each of said remote server and mobile data client. The local storage resource can be incorporated in or can be communicatively coupled to the network appliance. The core agent can be communicatively coupled to the remote server and to the network appliance. The network appliance can be configured to: determine which content is or is to be communicated by the remote server to the mobile data client, communicate the content or cause the content to be communicated from the local content resource to the mobile data client, and communicate a receipt acknowledgement towards the remote server in respect of the content communicated from the local content resource to the mobile data client after receipt thereof was acknowledged by the mobile data client, and detect a handoff or loss of connection between the network appliance and the mobile data client, and communicate and indication in respect thereof to the core agent. The core agent can be configured to: receive an indication from the network appliance that content associated with a certain TCP link between the remote server and the mobile data client is communicated to the mobile data client from a local content resource, and upon receiving the handoff or loss of connection indication with regard to the mobile data client has occurred, the core agent can be configured to continue sending acknowledgements to the remote server up to the last acknowledgment from the mobile data client reported by the network appliance, or instruct the remote server to jump to the last acknowledgment from the mobile data client reported by the network appliance.

Optionally, the network appliance can be configured to emulate a TCP connection between the remote server and the mobile data client including for content delivered from the local content resource.

Optionally when the network appliance determines which content is or is to be communicated by the remote server to the mobile data client, the network appliance can be configured to: determine if the content is available on the local content source, and if yes, obtain the content from the local content source, and communicate the content or cause the content to be communicated from the local content source to the mobile data client.

Optionally, the local storage resource can be implemented as an integrated component.

According to still another aspect of the presently disclosed subject matter, there is provided method of regulating data communication between a mobile data client communicatively coupled to an access point of a mobile data network and a remote server. According to examples of the presently disclosed subject matter the method can include: utilizing a network appliance communicatively coupled to remote server and mobile data client to intercept TCP communications from the remote server destined for the mobile data client; determining which content is or is to be communicated by the remote server to the mobile data client; communicating the content or causing the content to be communicated from a local content resource to the mobile data client; communicating a receipt acknowledgement towards the remote server in respect of the content communicated from the local content resource to the mobile data client after receipt thereof was acknowledged by the mobile data client; communicating an indication towards to core agent that content associated with a certain TCP link between the remote server and the mobile data client is communicated to the mobile data client from a local content resource; and in response to detecting a handoff of the mobile data client or loss of connection between the network appliance and the mobile data client, communicating an indication towards to core agent that the handoff or the loss of connection.

Optionally, communicating the content or causing the content to be communicated from a local content resource to the mobile data client, can further include emulating a TCP connection between the remote server and the mobile data client, including for content delivered from the local content resource.

Optionally, determining which content is or is to be communicated by the remote server to the mobile data client further can include: determining if the content is available on a local content source, and if yes, obtaining the content from the local content source.

BRIEF DESCRIPTION OF THE DRAWINGS

In order to understand the invention and to see how it may be carried out in practice, certain embodiments of the invention will now be described, by way of non-limiting example only, with reference to the accompanying drawings, in which.

Figure 1A:
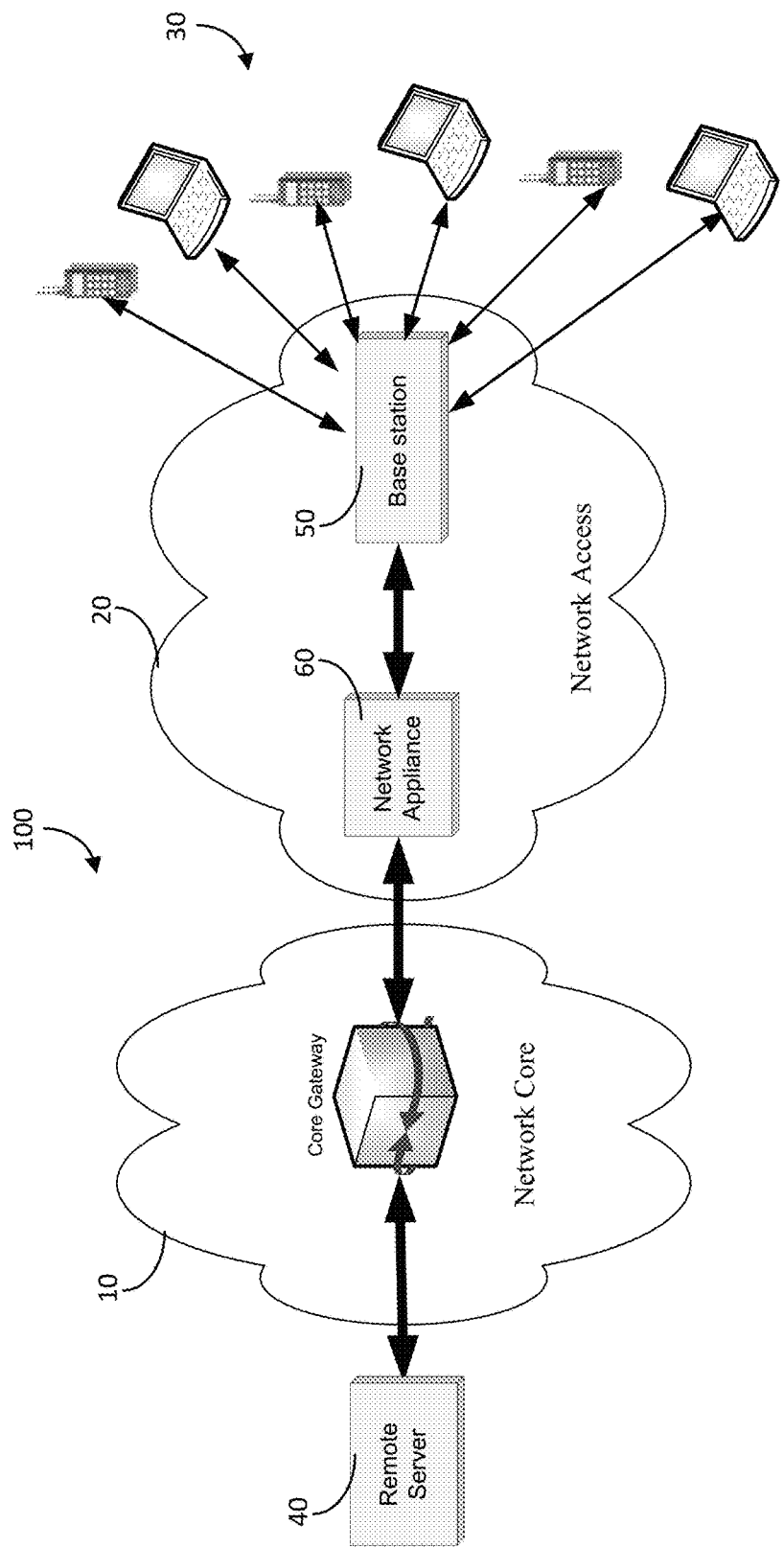
FIG. 1A is a high level network diagram of a mobile network according to examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

GENERAL DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Furthermore, it is appreciated that certain features of the invention, which are, described in the context of different embodiments, may also be provided in combination in a single embodiment. Conversely, various features of the invention, which are, for brevity, described in the context of a single embodiment, may also be provided separately or in any suitable sub-combination.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

Reference is now made to FIG. 1A, which is a high level network diagram of a mobile network according to examples of the presently disclosed subject matter. The network 100 shown in FIG. 1A is a simplified, high level illustration of a mobile communication network, such as is operated by many cellular network operators around the globe. The mobile network 100 includes a core network 10, and access point 20 and a plurality of mobile data clients 30. The plurality of mobile data client 30 are communicatively coupled to the access point 20, which is in turn communicatively coupled to the core network 10. The access point 20 can include one or more base stations 50 through which the core network 10 and the mobile data clients 30 communicate. Optionally, the access point 20 is part of a radio access network (RAN). It would be appreciated by those versed in the art that this is a basic description of a mobile data network, and that further details and possible implementations of a mobile data network can be devised by those versed in the art. A mobile network, as is known in the art, is a wireless network that is distributed over land areas called cells, each served by at least one fixed-location transceiver, known as a cell site or base station.

According to examples of the presently disclosed subject matter, a remote server 40 is communicatively coupled to the core network 10. For example, the remote server 40 can be communicatively coupled to the core network 10 (and through it to the mobile network 100) via a P-GW (PDN Gateway or Packet Data Network Gateway), BRAS (Broadband Remote Access Server), GSS (GPRS Sub-System), etc. A TCP communication link can be established between the remote server 40 and the mobile data client 30, through the core network 10 and the access point 20. The core network 10 can be configured to provide support for certain features of a mobile network, including for example: mobility, lawful interception and core functionality such as charging and policy, in general, and in particular for communications exchanged between the remote server 40 and each one of the plurality of mobile data clients 30.

The network appliance 60, according to examples of the presently disclosed subject matter, is a network entity that is placed within or in proximity of the access point 20, and is configured to virtually "break" the TCP connection between the remote server 40 and the mobile data clients 30 which are communicating through the access point 20 with which the network appliance is associated into two segments without terminating the original connection between the remote server 40 and the mobile data client. Optionally, the network appliance 60 is configured to and capable of detecting that the content that is communicated from the remote sever 40 to a mobile data client 30 with which the network appliance 60 is associated is available on a local content storage (now shown in FIG. 1A). Optionally, when it is detected that the content that is communicated from the remote sever 40 to a mobile data client 30 is available on a local content storage, the network appliance can be configured to cause the local content to be communicated to the mobile data client 30 from the local content storage, and may maintain the remote sever 40 synchronized with acknowledgement notifications received from the mobile data client 30. In this regard, the network appliance 60 can be configured to TCP stack on the local content storage side, while providing the necessary support for termination of the TCP itself by the remote server 60 (e.g., by the P-GW, GGS, BRAS etc.).

By way of non-limiting example in data networks which are include several segments, and where the segment at the edge of the network which connects to the mobile data clients is generally the least adequate for TCP traffic (such as is often the case in wireless networks) the network appliance 60 can be placed on the edge of this segment, e.g., at the edge of a RAN, or within a base station. The network appliance 60 can be configured to handle the TCP flow such that the round trip between the mobile data client 30 TCP stack and the remote sever 40 side TCP stack is reduced, compared to a configuration where the network appliance 60 is missing.

The network appliance 60 can be implemented a box level solution or can be added (e.g. integrated) into existing equipment. In this regard, it would be appreciated that the network appliance can be embodied in software running on standard computer hardware and/or it can be embodied in dedicated hardware (e.g., application specific hardware). Additional details with respect to the structure and operation of the network appliance are provided below.

Figure 1B:
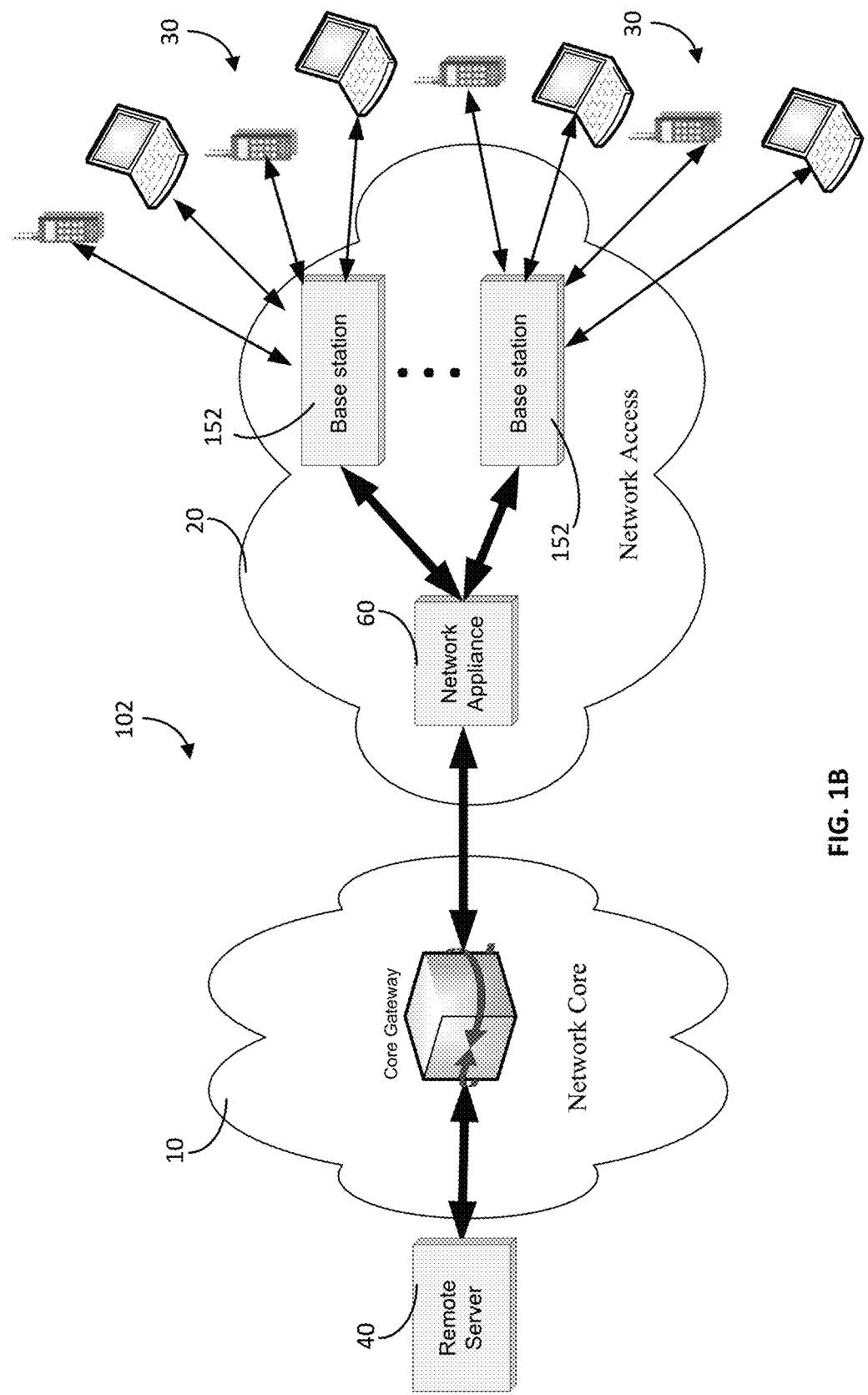
FIG. 1B is a high level network diagram of a mobile data network, wherein a mobile network appliance is coupled to and is functionally associated with a plurality of base stations of an access network in the mobile data network, according to examples of the presently disclosed subject matter.

In FIG. 1B there is shown a high level network diagram of a mobile data network, wherein a mobile network appliance is coupled to and is functionally associated with a plurality of base stations of an access network in the mobile data network, according to examples of the presently disclosed subject matter. In FIG. 1B the access network 20 includes a plurality of base stations 152 and 154, and the network appliance 60 can be operatively associated with a plurality of base stations in the access network 20. The network appliance 60 can be operatively associated with all of the base stations in a given access network 20, or with only some of them. Optionally, a given access network 20 can include more than one network appliance 60. Each network appliance 60 can be assigned to a particular base station, or a plurality of appliances can be assigned to any base station. In yet another example, a group of network appliances are assigned to a group of base stations.

Figure 1C:
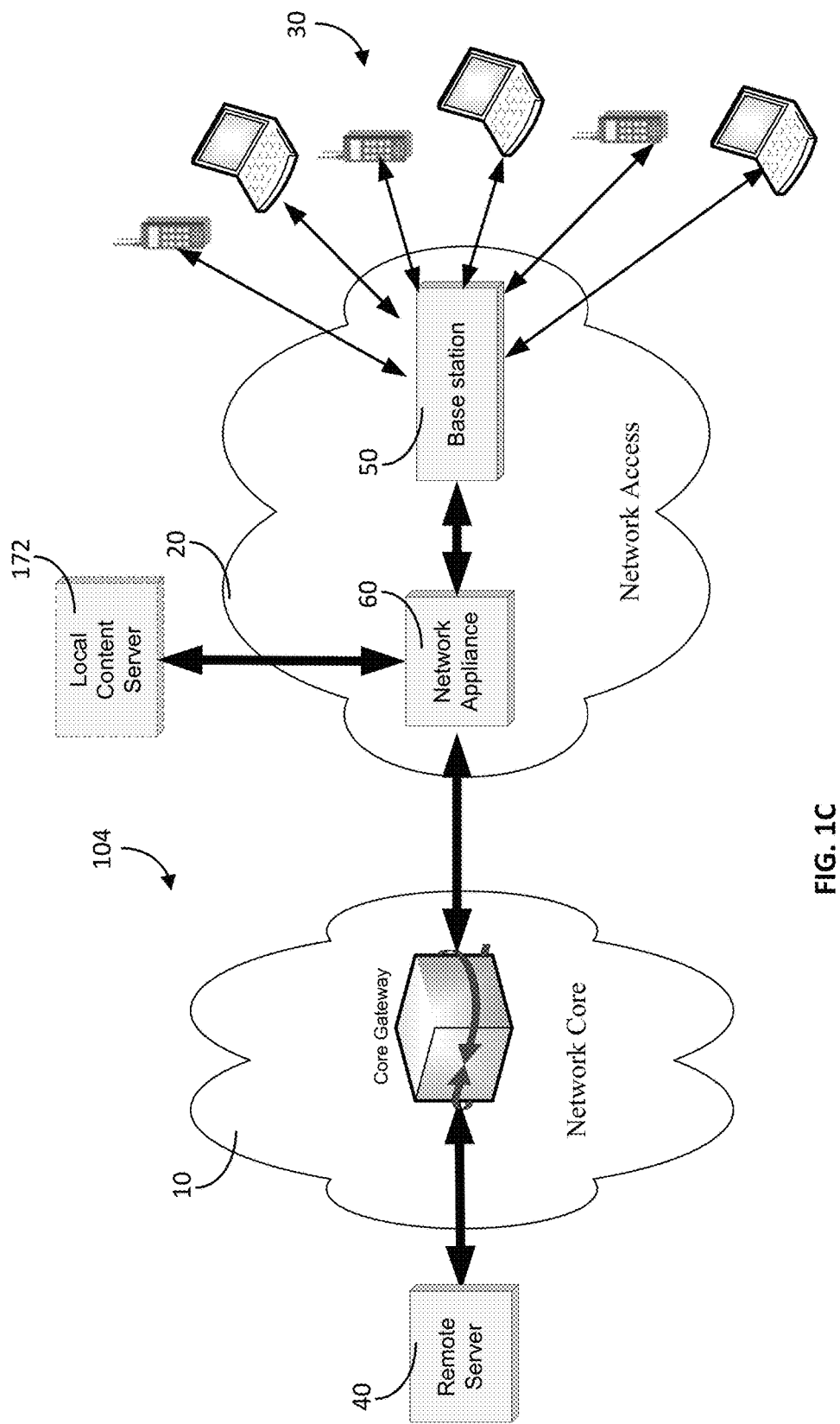
FIG. 1C is a high level network diagram of a mobile data network, wherein a mobile network appliance is coupled to a local content server, according to examples of the presently disclosed subject matter.

FIG. 1C is a high level network diagram of a mobile data network, wherein a mobile network appliance is coupled to a local content server, according to examples of the presently disclosed subject matter. According to examples of the presently disclosed subject matter, the network appliance 60 can include or can be associated with a local content storage 172. The local content storage 172 can be implemented as an internal cache, or it may be implemented as a content server, which is external to the network appliance 60, and to which the network appliance is communicatively coupled.

Optionally, the network appliance 60 can be configured to detect from intercepted TCP communication, en-route from the remote server 40 to a mobile data client 30 (that is communicating through the access point 20 with which the network appliance 60 is associated) that the content that is communicated from the remote server 40 to the mobile data client 30 is available on the local content storage 172. The network appliance 60 can provide the content to the mobile data client 30 from the local content storage 172, while maintaining the core network 10 and the remote sever 40 in synchronization with the acknowledgements received from the mobile data client 30. In case the network appliance 60 sends to the mobile data client 30 content from a local content storage 172, instead from the remote sever 40, the network appliance 60 can be configured to maintain compatibility and support for some or all of the core functionalities of the mobile network 104, including charging, policy, lawful interception, etc. Further details in respect of the local content storage, and the configuration of the network appliance which utilizes the local content storage are provided below.

Figure 2:
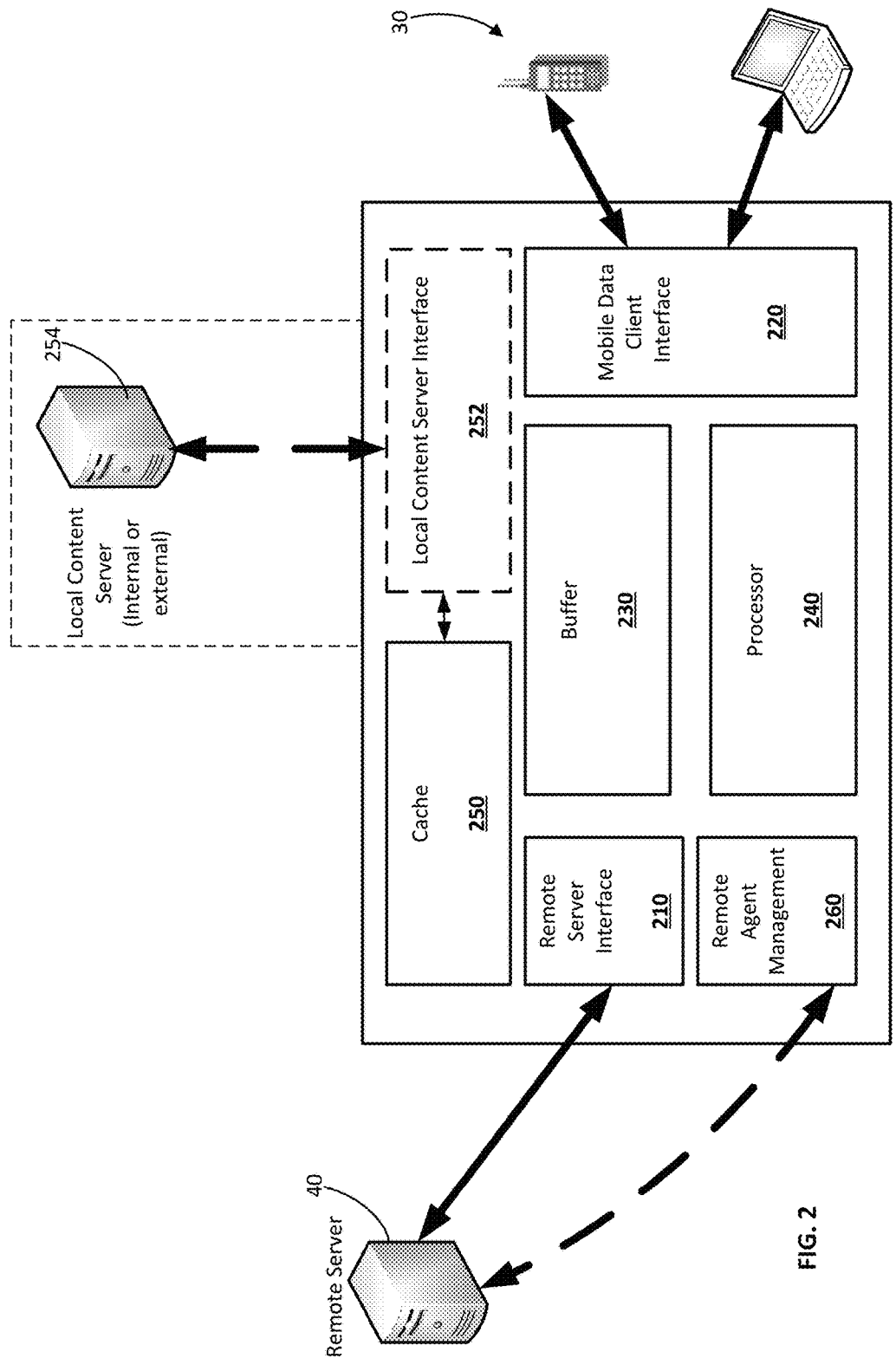
FIG. 2 is a block diagram illustration of a mobile data network appliance, according to examples of the presently disclosed subject matter.

Referring now to FIG. 2, there is shown a block diagram illustration of a mobile data network appliance, according to examples of the presently disclosed subject matter. According to examples of the presently disclosed subject matter, the network appliance 60 can include a remote server interface 210, a mobile data client interface 220, a buffer 230 and a processor 240. The network appliance 60 can be implemented within a mobile network. The network appliance 60, according to examples of the presently disclosed subject matter, is a network entity that is placed within or in proximity of an access point of a mobile or a wireless network. Optionally, the network appliance is placed as close as possible to the mobile data client 30 that is associated with the network appliance 60 (or with which the network appliance is associated). It would be appreciated that the network appliance 60 can be associated with multiple mobile data clients 30. The mobile data clients 30 which are associated with a given network appliance 60 can be in proximity to one another, and the network appliance 60 can be placed in proximity to all or most of them. For example, the network appliance can be placed in a proximity of or can be integrated into a base station of the network 100, and this network appliance 60 can be assigned to serve some or all of the mobile data clients 30 which communicate through this particular base station. In yet further examples of the presently disclosed subject matter, a given network appliance 60 can be associated with a plurality of base stations, in particular, base stations which are in proximity to one another, and in this example, the network appliance can be configured to serve some or all of the mobile data clients 30 which are communicating through the plurality of base stations.

Resuming the description of FIG. 2, the remote server interface 210 is configured to communicatively couple the network appliance 60 to the remote server 40. The mobile data client interface 220 is configured to communicatively couple the mobile data network appliance 60 and the mobile data client 30. The processor 240 can be configured to intercept, through the remote server link interface 210, TCP communications from the remote server 40 destined for a mobile data client 30 with which the network appliance is associated 60. The processor 240 can be configured to store data from intercepted TCP communications in the buffer 230, and communicate to the remote server 40 a receipt acknowledgement for corresponding intercepted TCP communications upon storing the respective data in the buffer 230. The processor 240 is further configured to send buffered data to the mobile data client 30, and to clear from the buffer 230 storage buffered data for which a receipt acknowledgment was received form the mobile data client 30.

It would be appreciated that the buffer 230 that is used for temporarily storing intercepted TCP communications from the remote server 40 can be implemented for each TCP flow, that is for every remote server 40 and mobile data client 30 TCP session. It should note that the same physical storage unit or entity can be used for temporarily storing intercepted TCP communications for several TCP sessions, however, a virtual or a logical separation would be kept, for example, using appropriate data structures and/or pointers. The buffer storage can be implemented using any known computer storage or computer memory technology, including Flash drives and other SSD technologies, and can be a discrete unit or several storage units which are virtualized to appear as a single logical storage entity. In order to improve the robustness and/or the efficiency of the buffer storage, various storage management procedures can be implemented, including mirroring parity protection, striping etc. (as is the case when implementing various RAID storage management schemes for example).

According to examples of the presently disclosed subject matter, the processor 240 can be configured to emulate a TCP connection between the remote server 40 and the mobile data client 30 including for intercepted TCP communications. The processor 240 can be configured to replace or rewrite TCP communication headers, as necessary, to emulate the TCP connection between the remote server 40 and the mobile data client 30. In a similar manner, the processor 240 can be configured to replace or rewrite TCP communication headers for communications exchanged between the local content storage and the mobile data client 30. The processor 240 can be configured to provide the mobile data client 30 with content from the local content storage, while terminating the TCP flow between the mobile data client 30 and the remote server 40.

The processor 240 can include a discrete processing unit or can be a multi-core processor. The processor 240 can include multiple processors, and the multiple processors can be distributed. In case the multiple processor implementation is used, the multiple processors can be cooperatively managed as a combined processing entity to carry out the operations described herein.

According to examples of the presently disclosed subject matter, the network appliance 60 can also include or can be associated with a local content storage. In FIG. 2, two possible implementations of a local content storage are provided by way of illustration, namely, a local cache 250 and a local content server 254. The local cache 250 can be an integrated component of the network appliance 60, for example, the local cache 250 can be an array of Flash storage units and a storage controller which virtualized the array and allocates a logical storage unit for storing content thereon. In a further example, the local content server 254 can be a network entity that is separate from, but is communicatively coupled, to the network appliance 60. The network appliance 60 can include a local content sever interface 252 which communicatively couples the network appliance 60 to the local content server 254. Optionally, in this implementation, the local content server 254 is placed as close as possible to the network appliance 60. Each one of a plurality of network appliances in accordance with examples of the presently disclosed subject matter can be associated with its own local content server, or in other examples, a local content server can be associated with a plurality of network appliances.

The processor 240 can be configured to detect (e.g., from an intercepted communication) whether the content that is communicated from the remote server 40 to the mobile data client 30 is available on the local content storage. An example of a method which can be used to identify content being communicated in a mobile data network, and which can be used as part of examples of the presently disclosed subject matter, is described in USSN 2012/0221670, assigned to the assignee of the present application, and which is hereby incorporated by reference into the present application in its entirety. Optionally, the processor 240 can be configured such that if it detects that the content is available on the local content storage, the processor communicates the content from the local content storage to the mobile data client 30. The processor 240 can be further configured such that upon receiving receipt acknowledgement(s) from the mobile data client 30 for communication(s) with the content obtained from the local content storage, a TCP acknowledgement(s) is communicated from the mobile data network appliance 60 to the remote server 40, to thereby maintain the remote server 40 in synchronization with TCP receipt acknowledgements received from the mobile data client 30.

Optionally, in case the processor 240 detects that the content that is communicated from the remote server 40 to the mobile data client 30 is available on the local content storage, it will bypass the buffering of the intercepted communication in its buffer 230. Optionally, the processor 240 can notify the local content storage that this particular content is currently on demand, alternatively the processor 240 can issue control instructions which promote the particular content being communicated to the mobile data client 30 or otherwise affect the position of the content in an internal queue of the local content storage.

Optionally, for mobile networks, where the remote server 40 and the mobile data client 30 are connected over a non-flat IP connection (the TCP/IP packets are encapsulated in a tunnel, such as IuB, GTP-U, etc.), the network appliance 60, and specifically, by way of example, the processor 240 can utilizing deep packet inspection (DPI) capabilities to open the tunneled communications and reach the TCP flow. Thus, the processor 240 can be capable of implementing the TCP manipulations describe herein, including the interception of TCP communications arriving from the remote server 40 towards the mobile data client 30, and the segmentation of the TCP connection between the remote server 40 and the mobile data clients 30 into two segments without terminating the original connection between the remote server 40 and the mobile data client 30. The DPI capabilities can also be used for detecting that the content that is communicated from the remote server 40 to the mobile data client 30 is available on the local content storage, and for enabling the communication of the content from the local content storage, while maintaining the remote server 40 in synchronization with TCP receipt acknowledgements received from the mobile data client 30.

Figure 3:
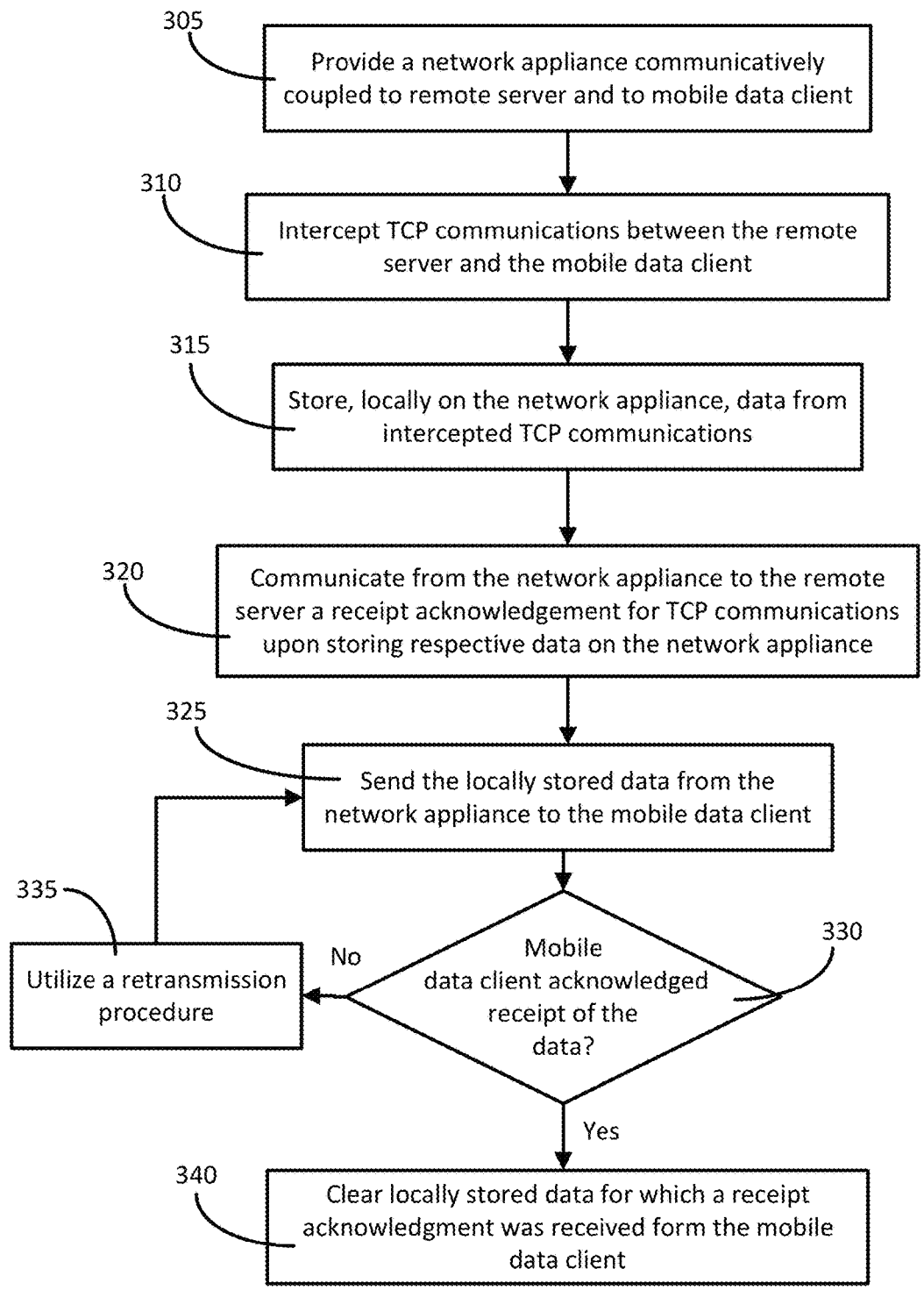
FIG. 3 is a flowchart diagram illustrating a method of regulating data communication between a mobile data client communicatively coupled to an access point of a mobile data network and a remote server, according to examples of the presently disclosed subject matter.

Referring now to FIG. 3, there is shown is a flowchart diagram illustrating a method of regulating data communication between a mobile data client communicatively coupled to an access point of a mobile data network and a remote server, according to examples of the presently disclosed subject matter. According to examples of the presently disclosed subject matter, the method shown in FIG. 3 and described herein below can be implemented using the physical elements described in any of FIGS. 1A-1C and 2. However, it would be appreciated that this method is not limited in implementation to these specific physical elements and can be implemented using any suitable computer, electronic and analogue hardware.

At block 305, there is provided a network appliance that is communicatively coupled to a remote server and to a mobile data client. TCP communications between the remote server and the mobile data client are intercepted (block 310). Since the network appliance is functionally associated with the access point through which the remote server and the mobile data client are communicating, the network appliance is capable of intercepting communications exchanged between the remote server and the mobile data client, and vice-versa from the client to the server.

The intercepted TCP communications from the remote server are stored locally on the network appliance or on a storage unit that is associated with the network appliance (block 315). In case that local content storage is not part of the network appliance, it is located very close to the network appliance, and is much closer than the remote server. The vicinity of network elements is the present disclosure directly related to network latency. For example, a first and a second network nodes are considered here to be "close" to one another when the round trip time (RTT) of communications between the two nodes is significantly shorter compared to the round trip time of communications between the first node, for example, and a third node. It would be appreciated that other network latency measures can be used as an indicator or benchmark of the "closeness" network nodes. For example, a latency in the order to 10-15 millisecond seconds can be considered a useful benchmark for an acceptable distance between nodes.

Once the intercepted TCP communications from the remote server are stored locally on the network appliance (in a cache or one the local storage sever), a receipt t acknowledgement can be communicated from the network appliance to the remote server in regard to the buffered communication (block 320). The term receipt acknowledgment as it used in the description and in the claims can include the basic TCP acknowledgements (ACK), but can also include selective acknowledgement notification (SACK). SACK is optional feature in the current TCP protocol standard, and allows a device to acknowledge non-contiguous segments individually. As is known to those versed in the art to use SACK, the two devices on the connection (in this case, for example, the network appliance and the remote server but can also be the mobile data client and the network appliance as well as other network entities involved) must both support the feature, and must enable it by negotiating the Selective Acknowledge Permitted (SACK-Permitted) option in the SYN segment they use to establish the connection. Assuming this is done, either device can include in a regular TCP segment a Selective Acknowledgment (SACK) option. This option includes a list of sequence number ranges of segments of data that have been received but have not been acknowledged since they are non-contiguous.

According to further examples of the presently disclosed subject matter, the network appliance can be configured to send to the remote server information about its own (the network appliances') congestion window. Optionally, the information with regard to the network appliances' conges-tion window can be incorporated into the acknowledge messages that the network appliance transmits to the remote server in connection with intercepted TCP communications. The congestion window information that is provided by the network appliance can be generated by an internal algorithm that is implemented by the network appliance. Such an internal algorithms may take into account, for example, a current state of all segment buffers handled by the network appliance (for all TCP flows running through the network appliance), the application that is associated with each of these flows, and the rate of acknowledgement notification that is being transmitted by corresponding mobile data clients per each respective flow (which may server as an indication about the available resources per flow), etc. In one example, the algorithms may be a congestion window optimization algorithms which may seek to find given a certain bandwidth as a constraint what would be the best allocation for each one of a plurality of TCP flows taken into account various parameters, including for example, those mentioned above, were each parameter is weighted according to its relative importance. It would be appreciated that this is merely one example of an algorithm that can be devised for managing the congestion window communications with the remote server.

Optionally, the network appliance can be configured to be transparent in its communications with the remote server and the mobile data client, such that when the network appliance communicates with the remote server in connection with a communication that was destined for a mobile data client with which the network appliance is associated, it appears to the remote server that the communication is coming from the mobile data client, and when the network appliance is communication with the mobile data client in connection with a communication that it received from the remote server, or instead of a communication that would otherwise come from the remote server, it would appear to the mobile data client that the communication is coming from the remote server. Thus, for example, the network appliance can be configured to send to the remote server the receipt acknowledgement for the intercepted TCP communications with headers which indicate that the receipt acknowledgement is coming from the mobile data client to which the communication was intended.

Optionally, as long as the buffer does not cross a capacity threshold (virtual or physical), the network appliance can be configured to continue storing inbound TCP communication from the remote server in the buffer, and sending receipt acknowledgments in respect thereof to the remote server. Still further by way of example, in the manner, the network appliance can be configured to send and continue sending receipt acknowledgments to the remote sever regardless of the state of the receipt acknowledges being received from the respective mobile data client.

Resuming now the description of FIG. 3, at some point, the locally buffered data can be communicated from the network appliance to the mobile data client (block 325). The network appliance uses TCP to communicate with the mobile data client as well. The network appliance can write the headers so that the mobile data client "believes" that the communication is coming from the remote server. The decision with regard to the timing of delivering any given buffered data to the mobile data client can be based on standard, or otherwise commonly used, TCP communication management mechanisms. If it is determined that the communication from the network appliance to the mobile data client failed to reach its destination (block 330), for example, when a predefined number of duplicate receipt acknowledgements are received from the mobile data client, the network appliance can be configured to utilize a retransmission procedure (block 335). The retransmission procedure, however, does not involve the remote server. The concern with regard to undelivered TCP communications is instead passed to the network appliance. The network appliance is less severely affected by failed communications, since, being much closer to the mobile data client compared to the remote server, its retransmits are significantly less costly (RTT is much shorter).

When it is determined that the communication from the network appliance to the mobile data client successfully reached its destination (block 330), for example, when a receipt acknowledgment is received from the mobile data client, the network appliance can be configured to clear the locally stored data in respect of which the receipt acknowledgment was received (block 340). The network appliance is thus configured to keep the locally buffered data at least until the mobile data client acknowledges the receipt thereof.

It would be appreciated that in the method presented in FIG. 3 and described herein, the operations implemented by the remote appliance isolate the remote server from the mobile data client regarding the congestion decisions, and the implications of failed TCP communications is reduced by retransmitting from the nearby network appliance, rather than from the remote server.

Figure 4:
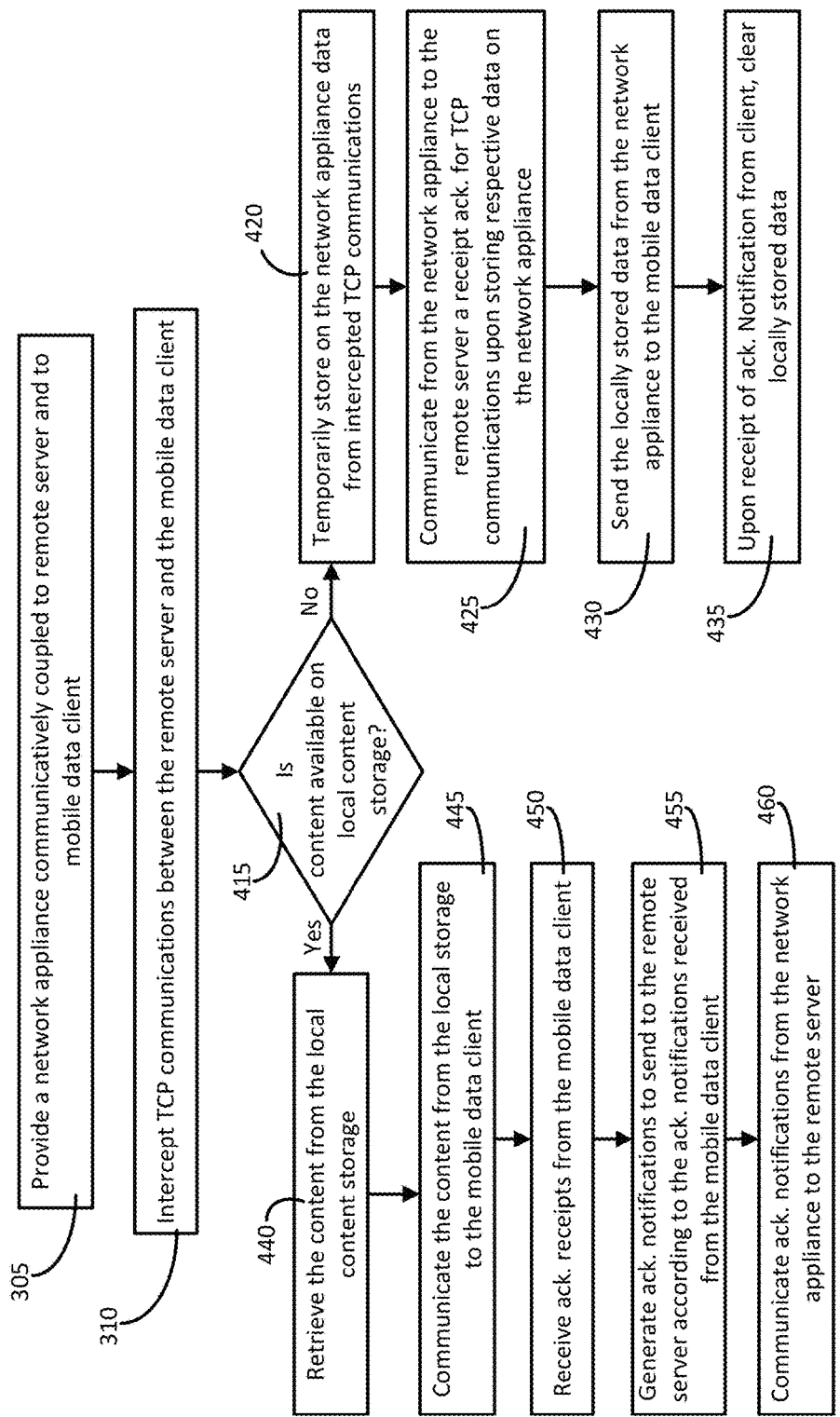
FIG. 4 is a flowchart diagram illustrating a method of regulating data communication between a mobile data client communicatively coupled to an access point of a mobile data network and a remote server, where the access point includes or is associated with a local content storage, according to examples of the presently disclosed subject matter.

Reference is now made to FIG. 4, which is a flowchart diagram illustrating a method of regulating data communication between a mobile data client communicatively coupled to an access point of a mobile data network and a remote server, where the access point includes or is associated with a local content storage, according to examples of the presently disclosed subject matter.

The method of FIG. 4 begins with the provisioning of the network appliance that is communicatively coupled to a remote server and to a mobile data client (block 305) and the interception of the TCP communications between the remote server and the mobile data client (block 310). However at the next block, it is determined whether the content that is being communicated or that is about to be communicated from the remote sever to the mobile data client is available on a local content storage with which the network appliance is associated (block 415). If it is not, the method of FIG. 3 from block 315 and onwards can be implemented. In FIG. 4, this method is represented by the following blocks: block 420, in which data from the intercepted TCP communications is stored in the network appliance buffer; block 425, in which, upon storing the data from the intercepted TCP communications in the network appliance's buffer, a receipt acknowledgement for the respective TCP communications is communication from the network appliance to the remote server; block 430, in which the locally buffered data is sent from the network appliance to the mobile data client, and as mentioned above, the network appliance takes charge of delivery of the TCP communications to the mobile data client, including the handling of failed communications and retransmissions; and block 435, in which, upon receipt of receipt acknowledgement from the mobile data client in respect of a TCP communication that was communicated from the network appliance to the mobile data client, the respective data is cleared from the local buffer.

If, however, it is determined at block 415 that the content that is being communicated or that is about to be communicated from the remote sever to the mobile data client is available on a local content storage with which the network appliance is associated, the method proceeds to block 440, in which the relevant content is retrieved from the local content storage. The retrieval of the content can be managed in various ways and forms which are known per-se. According to one example of the presently disclosed subject matter, the content can be identified based on the metadata of the communications, according to the size of the file with which the content is associated, etc. In another example, the method described USSN 2012/0221670 can be used for identifying the content that is being communicated or that is about to be communicated from the remote sever to the mobile data client.

Next the content from the local content storage is communicated to the mobile data client (block 445). Optionally TCP can be used to communicate the content that was retrieved from the local content storage to the mobile data client. The network appliance will then wait for receipt acknowledgments from the mobile data client, indicating that it successfully received the content or some part (segment(s) or packet(s)) of the content. In case the mobile data client failed to receive a certain part of the content, the network appliance can be configured to detect that the client did not receive a certain part (including which part failed to deliver) an can implement a retransmission of the relevant part or any other recovery procedure. Optionally a local storage management procedure or module is updated in response to the demand for this particular content item or part of content item from the mobile data client.

When the mobile data client successfully received the communication from the network appliance, it will communicate a receipt acknowledgement back to the network appliance in respect of the part of the content that it received. The receipt acknowledgement from the mobile data client is received at the network appliance (block 450). In response to receiving the receipt acknowledgement from the mobile data client in respect of the content or some part of the content, the network appliance can be configured to generate a receipt acknowledgement notification according to the receipt acknowledgement that it received form the mobile data client (block 455), and the network appliance can transmit the receipt acknowledgment which it generated to the remote server (block 460). Optionally, the network appliance can be configured to aggregate several receipt acknowledgements from the mobile data client and send to the remote server a single or a smaller number of receipt acknowledgements. The network appliance can determine when and which receipt acknowledgements to send to the remote server based on internal algorithms which it is implementing. According to examples, the network appliance can determine when and which receipt acknowledgements to send to the remote server based on network congestion status and indicators in order to achieve optimal network performance and maintain the remote server up to date for handoff situations.

The remote sever may continue to sending packets (or segments) according to the receipt acknowledgments it receives from the network appliance. In further examples of the presently disclosed subject matter, the receipt acknowledgments form the network appliance may include an indication (the indication can be explicit or implicit that the content is or will be from this point onwards communicated from the local content storage, rather than from the remote server. Optionally, the remote sever can be configured to send, from that point, keep-alive token packets according to the Acks/Sacks it is receiving. In still further examples, the keep-alive token packets sent by the remote sever may be discarded and the local content storage will serve the entity from which the content is sent to the mobile data client. This configuration can be supported by a proprietary protocol that can implemented by the network appliance and the remote server. Such propriety protocol can be, for example, an IP protocol with additional commands. An example of a possible implementation of such a protocol is described in USSN 2014/0348165, assigned to the assignee of the present application, and which is hereby incorporated by reference into the present application in its entirety.

Figure 5:
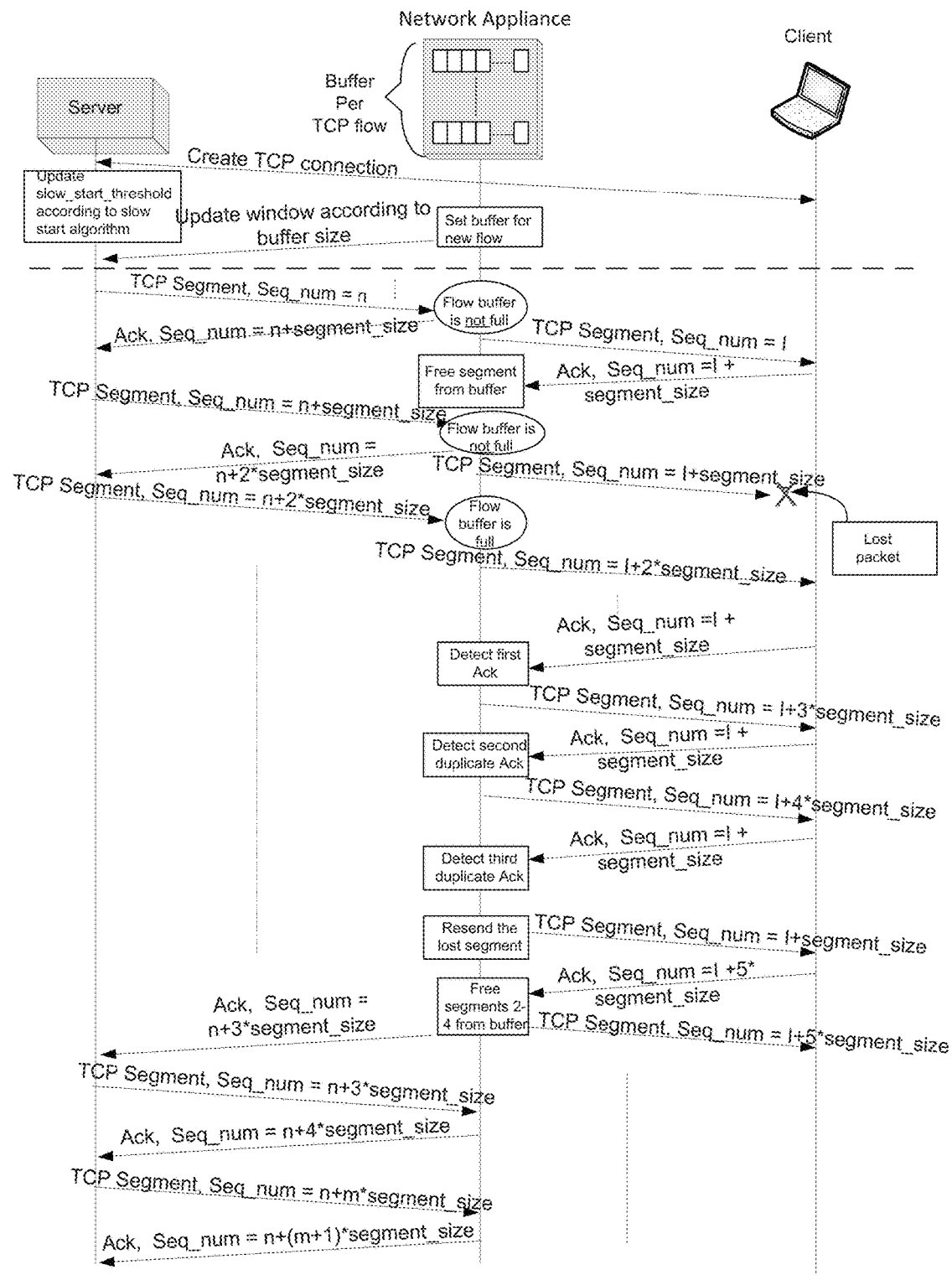
FIG. 5 is a call flow diagram illustrating an communication exchange according to a method of regulating data communication between a mobile data client communicatively coupled to an access point of a mobile data network and a remote server, in accordance with examples of the presently disclosed subject matter.

FIG. 5 is a call flow diagram illustrating exchanges of communications according to a method of regulating data communication between a mobile data client communicatively coupled to an access point of a mobile data network and a remote server, in accordance with examples of the presently disclosed subject matter. The sequence of communications shown in FIG. 5 begins when a mobile data client and a remote server exchange TCP connection setup communications. In the case of the standard TCP protocol, such messages are sometimes referred to as the three-way handshake. According to examples of the presently disclosed subject matter, the remote server can be configured to implement a slow start algorithm, and update a slow start threshold in accordance therewith.

According to examples of the presently disclosed subject matter, the TCP connection setup communications goes through the network appliance. The network appliance is configured to intercept the connection setup communications. Optionally, the network appliance can be configured to establish or allocate a flow buffer for the new TCP connection. Optionally, the network appliance can be further configured to communicate a congestion window size notification to the remote server according to the allocated flow buffer size. It would be appreciated that in many cases the network appliance can be capable of allocating a much larger window to the remote server, compared to what the mobile data client would allocate, since the network appliance can have dedicated storage resources which it can allocate for buffering communications from the remote server (per TCP flow). Optionally, the network appliance is configured to generate the congestion window size notification such that it would appear to the remote sever as though the message was communicated by the mobile data client with which it established the new TCP connection.

Next, the remote server starts to send TCP segments over the TCP connection. The TCP segments are intended for the mobile data client. In FIG. 5, the first segment (Seq_num=n) which is sent by the remote sever has a sequence number=n. The communication from the remote server is intercepted by the network appliance. As long as the flow buffer which was allocated for the TCP connection over which the intercepted communication was communicated, is not full (or has not reached a certain threshold), upon intercepting the communication from the remote server, the network appliance is configured to store the communication in the local buffer or at least the required parts of the packet that are needed for delivering the content to the mobile data client, and for completing the TCP with the remote server.

Once the intercepted TCP communication from the remote server is stored in the local buffer, a receipt acknowledgement can be communicated from the network appliance to the remote server.

At some point, after the intercepted communication was buffered on the network appliance, the network appliance can communicate the local buffered data (which was originally communicated by the remote server to the mobile data client) to the mobile data client. As can be seen in FIG. 5, the network appliance can optionally use different segment numbers for its communications with the mobile data client than the segments numbers which were used by the remote server in the intercepted communications (here Seq_num=1 is used between the network appliance and the mobile data client, and in the corresponding communication from the remote server to the network appliance Seq_num=n was used). Optionally, the network appliance can record a mapping between the different sets of segments numbers and can map segment numbers from different sets. In the scenario illustrated in FIG. 5, the next event occurs when the mobile data client communicates an acknowledgement notification to the network appliance. The same segment number scheme can be used in the link between the remote server to network appliance link and in the link between the network appliance and the mobile data client, and by keeping track of incoming communication's and ACKs synchronization across the links can be maintained. In response to receiving the acknowledgement notification at the network appliance, the network appliance can remove the respective data (e.g., the relevant segments) from its buffer.

The call flow diagram continues with an additional segment communicated from the remote server. Since the network appliance acknowledged receipt of the previous communication, the remote server is now sending the next chunk of data (Seq_num=n+segment_size). The network appliance's buffer is not full and so the network appliance stores the communication in the local buffer and sends a receipt acknowledgement to the remote server. The network appliance attempts to communicate the buffered data (as Seq_num=1+1*segment_size) to the mobile data client to which it was destined, but this time, the communication fails, and the data is not delivered to the mobile data client.

At some point, after the intercepted communication was buffered on the network appliance, the network appliance can communicate the local buffered data (which was originally communicated by the remote server to the mobile data client) to the mobile data client.

When the next communication from the remote server arrives at the network appliance the network appliance's buffer is or becomes (upon storing this new communication in the buffer) full (at least the portion of the buffer that is allocated for this particular TCP flow). Since the buffer is full, the network appliance does not yet acknowledge this last communication from the remote server. It would be appreciated that when the buffer is full, the network appliance loses its ability to retransmit communications which failed to reach their original destination—the mobile data client, in particular, in case the initial (relayed) communication failed. In addition, when the cache is full and cannot accept additional communications from the server the ability of the network appliance to adapt the communications towards the mobile data client, and for example, optimize them to the state of the link from the access point to the mobile data client.

The call flow resumes with the network appliance attempting to communicate the data which it recently received from the remote server (which had Seq_num=n+2*segment_size) toward the mobile data client (with Seq_num=1+2*segment_size). The remote mobile data client receives this communication and communicates a receipt acknowledgment communication back to the network appliance. The network appliance receives the receipt acknowledgment from the mobile data client, but since the client did not receive the previous communication from the network appliance it sends an acknowledgment notification with the highest sequence number that it did receive (which is Seq_num=I1+segment_size). So when the communications referencing Seq_num=1+2*segment_size, Seq_num=1+3*segment_size and Seq_num=1+4*segment_size are received at the mobile data client, the mobile data client responds to each with a receipt acknowledges according to the last sequential segment (or packet) which it successfully received, or in this case: Seq_num=1+segment_size. So, after receiving the third acknowledgement with Seq_num=1+segment_size, the network appliance will implement a fast retransmit, and retransmit the communication which failed to reach the mobile data client (Seq_num=1+segment_size).

This time, in the scenario shown in FIG. 5, the retransmitted communication is successfully received by the mobile data client. Now, since Seq_num=1+2*segment_size, Seq_num=1+3*segment_size and Seq_num=1+4*segment_size were all delivered to the mobile data client, the mobile data client sends an acknowledgement notification according to the last sequential segment (or packet) which it successfully received, and in this case: Seq_num=1+5*segment_size. The network appliance can now clear segments 2-4 from its buffer. The communication goes on, and as long the buffer for the TCP flow is not full, the network appliance acknowledges communications from the remote server after it buffers them, and manages the forwarding of the data intercepted form the remote server to its original mobile data client destination in a distinct process.

It would be appreciated that fast retransmit can be tuned to kick-in after any number greater than one acknowledgements with the same sequence number are received, and the network appliance can be configured accordingly.

Figure 6:
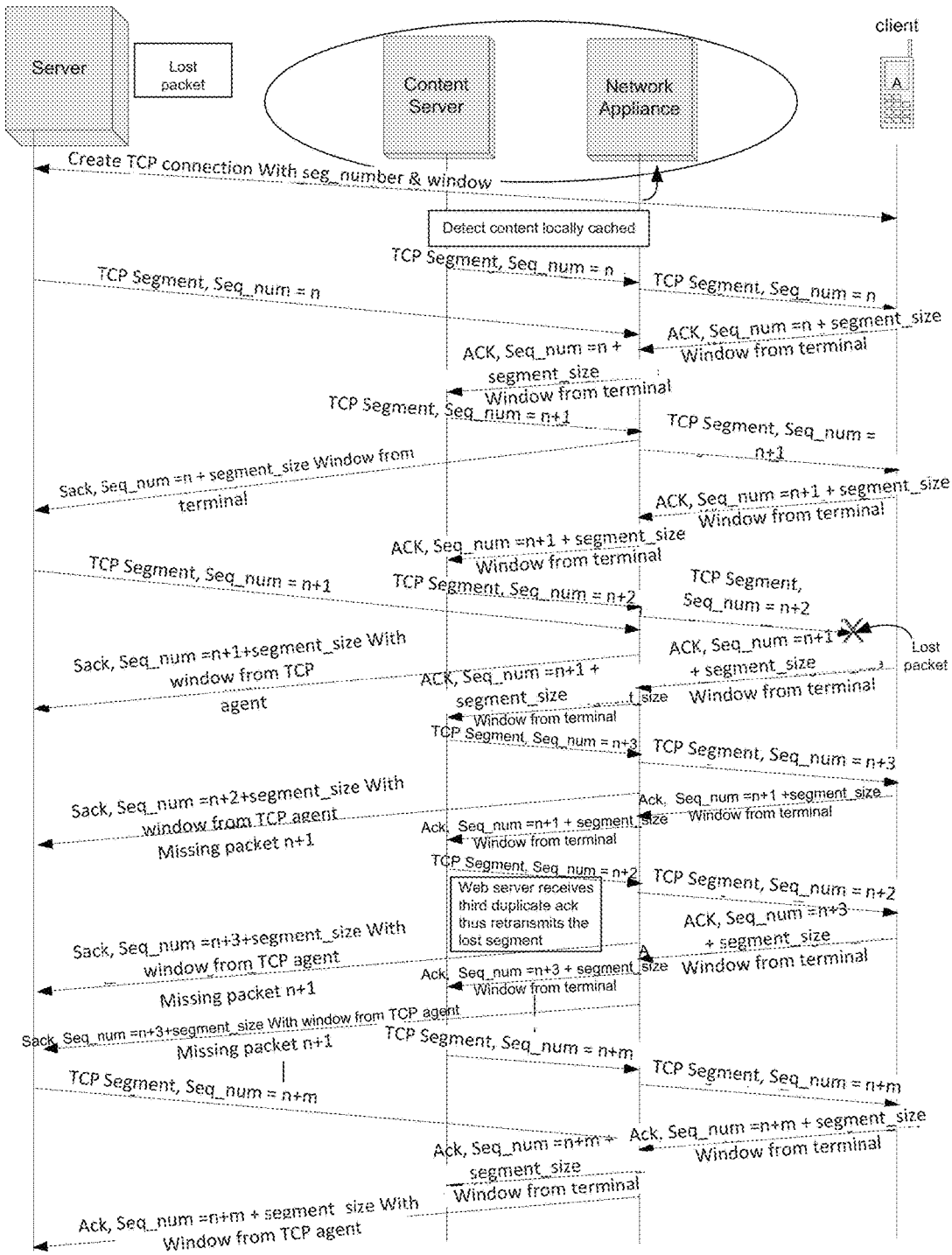
FIG. 6 is a call flow diagram illustrating an communication exchange according to a method of regulating data communication between a mobile data client communicatively coupled to an access point of a mobile data network and a remote server, where the access point includes or is associated with a local content storage, in accordance with examples of the presently disclosed subject matter.

Reference is now made to FIG. 6 which is a call flow diagram illustrating a communication exchange according to a method of regulating data communication between a mobile data client communicatively coupled to an access point of a mobile data network and a remote server, where the access point includes or is associated with a local content storage, in accordance with examples of the presently disclosed subject matter. Initially, the TCP connection is established (the three-way handshake) between the remote server and the mobile data client, through the network appliance. The network appliance detects that the content that the mobile data client is requesting from the server, is available on a local content server that is associated with the network appliance. The network appliance and the local content server can deliver the content to the mobile data client more efficiently than the remote server (through the network appliance). The network appliance establishes a (TCP) connection with the mobile data client and communicates the content from the local content server to the mobile data client.

As is shown in FIG. 6, once the TCP links are established (between the remote server and the network appliance, between the local content server and the network appliance and between the network appliance and the mobile data client) the TCP Segment Seq_num=n is obtained by the network appliance from the local content sever, and delivered from the network appliance to the mobile data client. The mobile data client acknowledges receipt (Seq_num=n+segment_size), and the network appliance acknowledges the same segment to the local content storage. The remote sever also sends the content which was delivered to the mobile data client from the local content storage (TCP Segement, Seq_num=n), but this communication can be ignored or dropped, and it will not reach the mobile data client (which already received the content).

The network appliance continues to retrieve additional segment from the local content storage, and communicates the content to the mobile data appliance (see for example TCP Segement, Seq_num=n+1). At some point, a packet which was communicated by the network appliance is lost (TCP Segement, Seq_num=n+2). In the scenario shown in FIG. 6, the network appliance and the remote server support and implement Sack notifications. As can be seen in FIG. 6, the network appliance uses SACK communications to indicate to the remote server that while TCP Segement, Seq_num=n+2 was not yet acknowledged by the mobile data client, later segments were acknowledged. When the retransmission mechanism is triggered, the lost packet (or segment) is retransmitted by the network appliance to the mobile data client. In FIG. 6, the network appliance obtains the necessary data from the local content storage, for example, since it was already dropped from the network appliances internal buffer for that TCP link (which is not necessarily the same buffer that is used for the corresponding TCP link between the network appliance and the remote server). The delivery of the content from the local content storage to the mobile data client through the network appliance, which maintains the remote server aware of the delivered content, can go on until the session ends or it can also stop when a handoff occurs, e.g., when the mobile data client switches to a different access point, which is not associated with the same network appliance.

Figure 7:
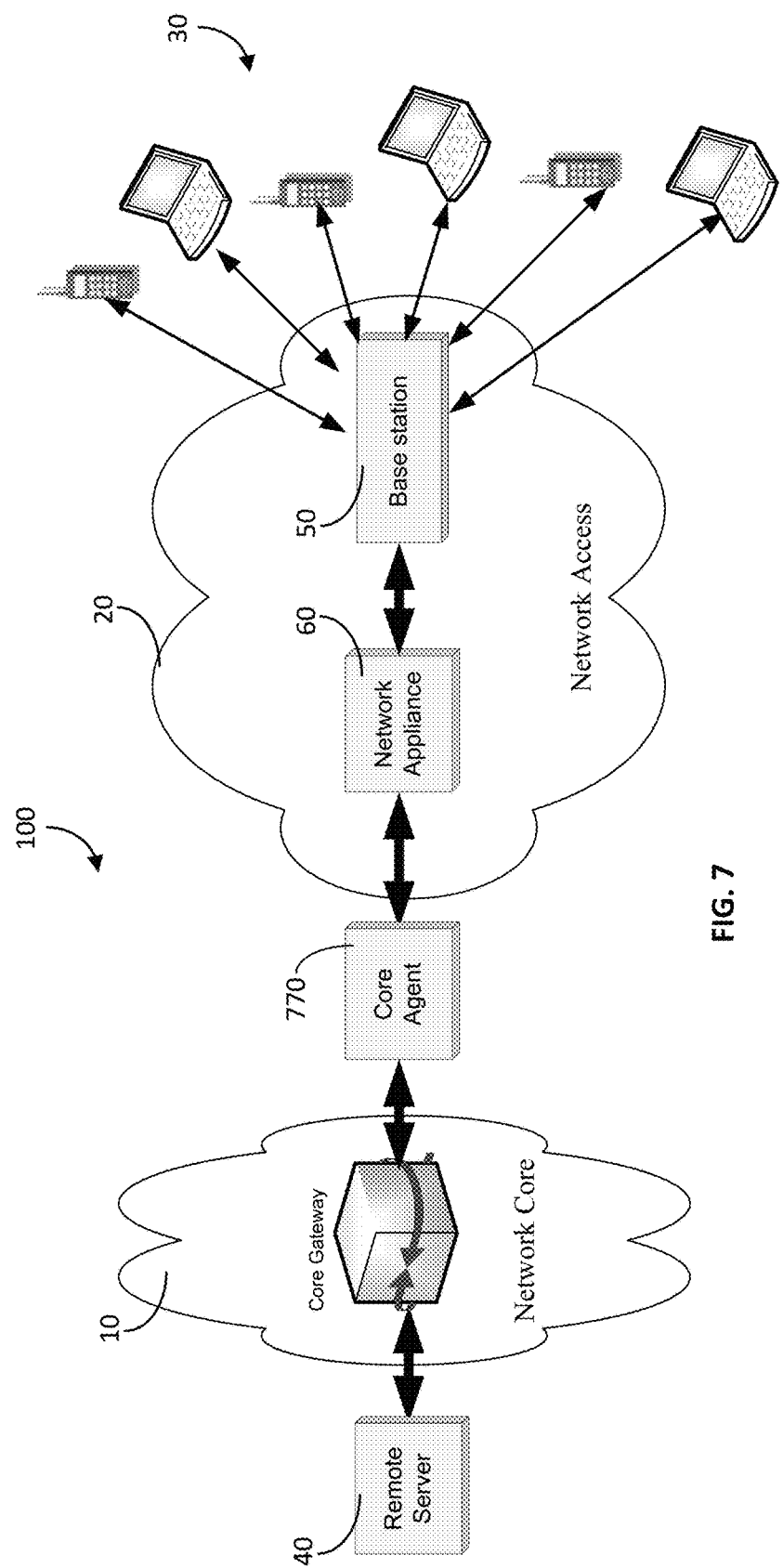
FIG. 7 is a high level network diagram of a mobile network including a core agent, according to examples of the presently disclosed subject.

Reference is now made to FIG. 7, which is a high level network diagram of a mobile network including a core agent, according to examples of the presently disclosed subject. The network shown in FIG. 7, is similar to the network that was shown in FIG. 1A and which was described above with reference to FIG. 1A, with the addition of a core agent 770. The core agent 770, which is an optional component, can be implemented such that it is placed just after the mobile core 10 towards the RAN 20. The core agent 770 is communicatively coupled to the remote server 40 and to the network appliance 60. The core agent 770 is configured to receive an indication from the network appliance that the content associated with a certain TCP link between a remote server 40 and a mobile data client 30 is actually communicated to the mobile data client from a local content resource, through the network appliance 60.

According to examples of the presently disclosed subject matter, when the network appliance 60 provides content to a mobile data client 30 from a local content resource, all packets which are communicated to the mobile data client 30 can also be sent by the remote server 40 (according to the Acks received by the remote server from the network appliance 60). The core agent 770 is positioned in between the core network 10 and the RAN 20, and can intercept the packets communicated by the remote server 40. When packets from the remote server 40 reach the core agent 770, and the core agent 770 is aware that the delivery of these packet is handled by the network appliance 60 (using a local content resource), the core agent 770 can be configured to either eliminate the packets in one example, or to pass the packets towards the network appliance 60 as full packets or as token packets (very small packets).

Upon handoff of the terminal from one base station to the other (or outside a group of base stations which are serviced by a given network appliance), the core agent 770 can hold the last Ack sent by the mobile data client 30 and passed to the core agent 770 via the network appliance 60, and the core agent 770 will continue sending Acks towards the remote server 40, or cause the remote server 40 to jump to the location in the object according to the Acks received from the network appliance 60 using any other method. The network appliance 60 can be configured to send Acks to the core agent 770 routinely, e.g. whenever an Ack is received from the mobile data client, or the network appliance 60 can be configured to send Acks to the core agent 770 when it detects that a mobile data client with which it was engaged in an active TCP session, sending content to the client from a local content resource instead of the content from the remote server 40, so that the core agent can support the handoff and resumption of the content delivery from the point where it stopped right before the handoff. Once the remote server 40 has reached the required point of the object, following packets will be passed by the core agent 770 towards the mobile data client 30 as full packets, thus continuing the download of the object towards the mobile data client 30 from the last packet that was received prior to the handoff. In case at the new base station there is a new network appliance, a similar process of delivering the content from the local content resource through the new network appliance can take place.

It would be appreciated that in mobile networks, additional requirements may exist, including support for mobility, lawful interception and core functionality such as charging and policy. The core agent 770 can support such additional requirements and cooperate with the network appliance 60 in a manner to meet such additional requirements.

Figure 8:
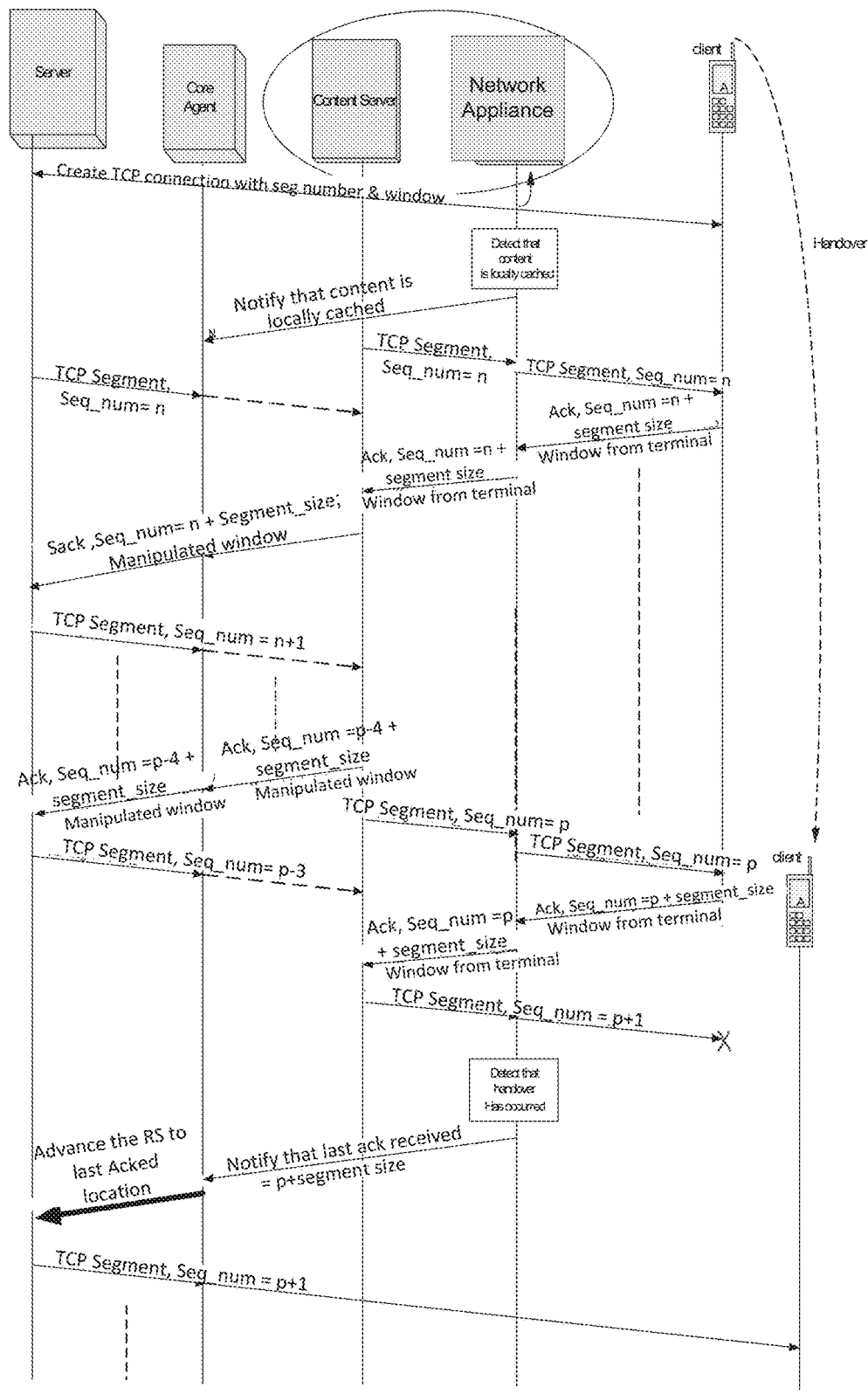
FIG. 8 is a call flow diagram illustrating a communication exchange according to a method of regulating data communication between a mobile data client communicatively coupled to an access point of a mobile data network and a remote server, where the access point includes or is associated with a local content storage, and further including a core agent in between the mobile core and the RAN, in accordance with examples of the presently disclosed subject matter.

Reference is now made to FIG. 8, which is a call flow illustrating a communication exchange according to a method of regulating data communication between a mobile data client communicatively coupled to an access point of a mobile data network and a remote server, where the access point includes or is associated with a local content storage, and further including a core agent in between the mobile core and the RAN, in accordance with examples of the presently disclosed subject matter. As can be seen in FIG. 8, a TCP link is established between the remote server and the mobile data client. The network appliance intercepts the communications exchange between the remote server and the mobile data client, and identifies that the content that is or is about to be communication from the remote server to the mobile data client is available on a local content resource. According to examples of the presently disclosed subject matter, in such a case, the network appliance can be configured to send an indication to the core agent that the content which is or is about to be communicated by the remote server toward the mobile data client will actually be delivered to the mobile data client by the network appliance, from a local content resource. Thus, the network appliance begins to retrieve the data request by the mobile data client from a local content resource, and communicates it to the mobile data client, and the latter acknowledges the segments which it receives from the network appliance. The network appliance can emulate the remote server, so that the mobile data client believes that the content is coming from the remote server. In the meantime, the remote server sends the content downstream, towards the mobile data client, and the communications from the remote server can be intercepted by the core agent, which is aware that the content is actually being delivered to the mobile data client (the destination of the communication from the remote server) by the network appliance. The core agent can be configured to either eliminate the packets from the remote server, in one example, or to pass the packets towards the network appliance as full packets or as token packets.

This routine, where the network appliance retrieves content from the local content storage and delivers it to the mobile data client, and the remote server sends content which is intercepted and handled by the core agent, continues until, at some point, the network appliance losses its connection with the mobile data client, and the network appliance identifies that a handoff has occurred. According to examples of the presently disclosed subject matter, when the network appliance detects a loss of connection with the mobile data client, or otherwise detects a handoff, the network appliance can update the core agent, informing it that a handoff has occurred, and unless the network appliance routinely updated the core agent about Acks received from the mobile data client, the network appliance will communicate to the core agent the last received Ack from the mobile data client. The core agent which received the handoff notification will communicate with the remote server to advance it to the last Ack location which it received from the network appliance. Next, the TCP session between the remote server and the mobile data client can be resumed from the point where it was at just previous to the handoff. Since communication acknowledgements are forwarded to the server, the remote server should be capable of resuming the communication with the mobile data client from where it was previous to the handoff, or at least close to that point, delivering a seamless or a nearly seamless communication across different RANs base stations or groups of base stations that are associated with network appliances, or when switching from a base station which is associated with a network appliance to a base station which does not benefit from a network appliance technology in accordance with examples of the presently disclosed subject matter.

It would be appreciated that some examples of the presently disclosed subject matter can improve the performance of a mobile network and at the same time offer good support for essential, critical and generally important functions or features of a mobile data network, including, for example, handover, lawful interception and mobile core functionality (charging, policy etc).

The invention claimed is:

1. A mobile data network appliance for regulating data communication between a mobile data client communicatively coupled to an access point of a mobile data network and a remote server, said network appliance comprises:
   a mobile data client interface configured to communicatively couple the mobile data network appliance and the mobile data client;
   a remote server interface configured to communicatively couple the network appliance and the remote server;
   a buffer storage;
   a controller configured to:
      intercept, through the remote server interface, TCP communications from the remote server destined for the mobile data client;
      store data from the intercepted TCP communications in the buffer storage and communicate to the remote server a receipt acknowledgement for corresponding intercepted TCP communications upon storing said respective data in the buffer; send buffered data to the mobile data client; and
      clear buffered data from the buffer storage for which a receipt acknowledgment was received form the mobile data client;
   wherein, when the controller determines that content being, or is to be, communicated by the remote server to the mobile data client is available on a local content server, and the controller is configured to utilize a local content server interface to obtain the content from the local content server, and
   wherein the controller is further configured to:
   (i) communicate the content from the local content server to the mobile data client; and (ii) communicate a receipt acknowledgement to the remote server in respect of content communicated from the local content server to the mobile data client after receipt thereof was acknowledged by the mobile data client.

2. The appliance according to claim 1, wherein the controller is configured to emulate a TCP connection between the remote server and the mobile data client.

3. The appliance according to claim 1, wherein the controller is configured to send buffered data to the mobile data client asynchronously with receipt of a corresponding TCP communication from the remote server.

4. The appliance according to claim 1, wherein the controller is configured to send a receipt acknowledgement to the remote server in respect to communications which were successfully delivered to the mobile data client, are associated with communications from the remote server to the mobile data client and were intercepted by the network appliance.

5. The appliance according to claim 1, wherein the controller is configured to store data from the intercepted TCP communications in the buffer storage.

6. The appliance according to claim 1, further comprising a local content source, and wherein the controller is configured to:
determine which content is, or is to be, communicated by the remote server to the mobile data client;
determine if the content is available on the local content source and obtain the content from the local content source;
communicate the content, or cause the content to be communicated, from the local content source to the mobile data client, and
communicate a receipt acknowledgement to the remote server in respect to content communicated from the local content source to the mobile data client after receipt thereof was acknowledged by the mobile data client.

7. The appliance according to claim 6, wherein the appliance comprises a local cache which is configured to store content on the appliance, and wherein the local cache serves as a local content source.

8. The appliance according to claim 6, wherein the controller is further configured to detect a handoff, whereby the mobile data client disconnected from the network appliance, or to detect a loss of connection between the network appliance and the mobile data client, and, in response to detecting the handoff or the loss of connection, the controller is configured to communicate towards the remote server any outstanding acknowledgment that was received from the mobile data client which has not yet been received at the remote server.

9. The appliance according to claim 6, further comprising a core agent interface, wherein in response to a detection of a handoff, whereby the mobile data client disconnected from the network appliance, or in response to detection of a loss of connection between the network appliance and the mobile data client, the core network interface is configured to communicate towards the remote server any outstanding acknowledgment that was received from the mobile data client which has not yet been received at the remote server.

10. A mobile data network appliance for regulating data communication between a mobile data client communicatively coupled to an access point of the mobile data network and a remote server, said network appliance comprises:

a mobile data client interface configured to communicatively couple the mobile data network appliance and the mobile data client;
a remote server interface configured to communicatively couple the network appliance and the remote server;
a local storage resource interface configured to communicatively couple the network appliance and a local storage resource;
a core agent interface configured to communicatively couple the network appliance and a core agent; and
a controller configured to:
determine which content is, or is to be, communicated by the remote server to the mobile data client, communicate the content, or cause the content to be communicated, from a local content resource to the mobile data client, and communicate a receipt acknowledgement towards the remote server of the content communicated from the local content resource to the mobile data client after receipt thereof was acknowledged by the mobile data client,
communicate an indication towards the core agent that content associated with a certain TCP link between the remote server and the mobile data client is communicated to the mobile data client from a local content resource; and
detect a handoff of the mobile data client, or loss of connection between the network appliance and the mobile data client, and communicate an indication towards the core agent of the handoff or the loss of connection.

11. The appliance according to claim 10, wherein the controller is configured to emulate a TCP connection between the remote server and the mobile data client.

12. The appliance according to claim 10, wherein when the controller determines which content is, or is to be, communicated by the remote server to the mobile data client, the controller is further configured to:
determine if the content is available on the local content source and obtain the content from the local content source; and
communicate the content, or cause the content to be communicated, from the local content source to the mobile data client.

13. The appliance according to claim 10, wherein the local storage resource is an integrated component of said network appliance.

14. A mobile data network, comprising:
a remote server;
a local content server;
a mobile data client communicatively coupled to an access point of the mobile data network; and
a network appliance communicatively couple to each of said remote server and mobile data client, wherein the network appliance is configured to:
intercept TCP communications from the remote server destined for the mobile data client;
temporarily store in a buffer data from intercepted TCP communications and communicate to the remote server a receipt acknowledgement for corresponding intercepted TCP communications upon locally buffering said respective data;
send locally buffered data to the mobile data client;
clear locally buffered data upon receiving a receipt acknowledgment from the mobile data client;
determine which content is being, or is to be, communicated by the remote server to the mobile data client;

determine if the content is available on the local content server;
communicate the content, or cause the content to be communicated, from the local content server to the mobile data client, and
communicate a receipt acknowledgement to the remote server in respect of content communicated from the local content server to the mobile data client after receipt thereof was acknowledged by the mobile data client.

15. The network according to claim 14, wherein the network appliance is configured to emulate a TCP connection between the remote server and the mobile data client.

16. The network according to claim 14, wherein the network appliance is configured to send buffered data to the mobile data client asynchronously with receipt of a corresponding TCP communication from the remote server.

17. The network according to claim 14, wherein the network appliance is configured to send a receipt acknowledgement to the remote server in respect to communications which were successfully delivered to the mobile data client, are associated with communications from the remote server to the mobile data client and were intercepted by the network appliance.

18. The network according to claim 14, wherein the network appliance is configured to store data from the intercepted TCP communications in the buffer.

19. The network according to claim 14, wherein the network appliance is configured to:
determine which content is, or is to be, communicated by the remote server to the mobile data client;
determine if the content is available in a local content cache of the network appliance,
communicate the content or cause the content to be communicated from the local content cache to the mobile data client, and
communicate a receipt acknowledgement to the remote server in respect to content communicated from the local content cache to the mobile data client after receipt thereof was acknowledged by the mobile data client.

20. The network according to claim 14, further comprising a core agent interface communicatively coupled to the remote server and to the network appliance, and wherein the core agent interface is configured to:
receive an indication from the network appliance that content associated with a certain TCP link between the remote server and the mobile data client is communicated to the mobile data client from a local content resource;
intercept packets communicated by the remote server over the TCP link; and
upon receiving an indication from the network appliance that a handoff or loss of connection between the network appliance and the mobile data client has occurred, continue to send acknowledgements to the remote server up to the last acknowledgment from the mobile data client reported by the network appliance, or instruct the remote server to jump to the last acknowledgment from the mobile data client reported by the network appliance.

21. The network according to claim 20, wherein the network appliance is configured to:
determine which content is, or is to be, communicated by the remote server to the mobile data client;
determine if the content is available in a local content resource of the network appliance,
communicate the content, or cause the content to be communicated, from the local content resource to the mobile data client; and
communicate a receipt acknowledgement towards the remote server in respect to content communicated from the local content resource to the mobile data client after receipt thereof was acknowledged by the mobile data client.

22. The network according to claim 21, wherein the core agent interface is configured to intercept the receipt acknowledgments communicated from the network appliance to the remote server.

23. The network according to claim 22, wherein the core agent interface is configured to, while the content is delivered to the mobile data client by the network appliance from a local content resource, eliminate communications with the same content from the remote server to the mobile data client.

24. The network according to claim 22, wherein the core agent interface is configured to, while the content is delivered to the mobile data client by the network appliance from a local content resource, communicate towards the mobile data client token packets instead of the original full packets communicated by the remote server towards the mobile data client.

25. The network according to claim 22, wherein the core agent interface is configured to, while the content is delivered to the mobile data client by the network appliance from a local content resource, communicate towards the mobile data client the original full packets communicated by the remote server towards the mobile data client.

26. The network according to claim 20, wherein the core agent interface is located after a mobile core of the network and towards a radio access network with which the network appliance is associated.

27. A mobile data network, comprising:
a remote server;
a mobile data client communicatively coupled to an access point of the mobile data network;
a network appliance communicatively coupled to each of said remote server and mobile data client;
a local storage resource incorporated in, or communicatively coupled to, the network appliance; and
a core agent communicatively coupled to the remote server and to the network appliance;
wherein the network appliance is configured to:
determine which content is, or is to be, communicated by the remote server to the mobile data client,
communicate the content, or cause the content to be communicated, from the local storage resource to the mobile data client, and communicate a receipt acknowledgement towards the remote server in respect of the content communicated from the local content resource to the mobile data client after receipt thereof was acknowledged by the mobile data client, and
detect a handoff, or loss of connection, between the network appliance and the mobile data client, and communicate an indication in respect thereto to the core agent, and
wherein the core agent is configured to:
receive an indication from the network appliance that content associated with a certain TCP link between the remote server and the mobile data client is communicated to the mobile data client from a local content resource, and upon receiving the handoff, or loss of connection, indication with regard to the mobile data client, continue to send acknowledgements to the remote server up to the last acknowledgment from the mobile data client reported by the network appliance, or instruct the remote server to jump to the last acknowledgment from the mobile data client reported by the network appliance.

28. The network according to claim 27, wherein the network appliance is configured to emulate a TCP connection between the remote server and the mobile data client.

29. The network according to claim 27, wherein when the network appliance determines which content is, or is to be, communicated by the remote server to the mobile data client, the network appliance is further configured to:
  determine if the content is available on the local content source; and
  communicate the content, or cause the content to be communicated, from the local content source to the mobile data client.

30. The network according to claim 27, wherein the local storage resource is implemented as an integrated component of said network appliance.

31. A method of regulating data communication between a mobile data client communicatively coupled to an access point of a mobile data network and a remote server, comprising:
  utilizing a network appliance communicatively coupled to remote server and mobile data client to intercept TCP communications from the remote server destined for the mobile data client;
  buffering, locally on the network appliance, data from intercepted TCP communications;
  communicating from the network appliance to the remote server a receipt acknowledgement for the intercepted TCP communications upon storing respective data on said network appliance;
  sending said locally buffered data from the network appliance to the mobile data client;
  on said network appliance, clearing locally stored data for which a receipt acknowledgment was received form the mobile data client;
  upon determining that content available on a local content server is, or is to be, communicated by the remote server to the mobile data client, utilizing a local content server interface to obtain the content from the local content server;
  communicating the content from the local content server to the mobile data client; and communicating a receipt acknowledgement to the remote server in respect of content communicated from the local content server to the mobile data client, after receipt thereof was acknowledged by the mobile data client.

32. The method according to claim 31, further comprising emulating a TCP connection between the remote server and the mobile data client.

33. The method according to claim 31, wherein said sending said locally buffered data from the network appliance to the mobile data client comprises sending buffered data to the mobile data client asynchronously with receipt of a corresponding TCP communication from the remote server.

34. The method according to claim 31, further comprising sending a receipt acknowledgement to the remote server in respect to communications which were successfully delivered to the mobile data client, associated with communications from the remote server to the mobile data client and were intercepted by the network appliance.

35. The method according to claim 31, wherein buffering comprises retaining buffered data from the intercepted TCP communications in a buffer as long as the buffer has sufficient space available for storing the data.

36. The method according to claim 31, further comprising:
  detecting a handoff, whereby the mobile data client disconnected from the network appliance, or a loss of connection between the network appliance and the mobile data client;
  and
  in response to detecting the handoff or the loss of connection, communicating towards the remote server any outstanding acknowledgment that was received from the mobile data client and which has not yet been received at the remote server.

37. A method of regulating data communication between a mobile data client communicatively coupled to an access point of a mobile data network and a remote server, comprising:
  utilizing a network appliance communicatively coupled to the remote server and the mobile data client to intercept TCP communications from the remote server destined for the mobile data client;
  determining which content is, or is to be, communicated by the remote server to the mobile data client;
  communicating the content, or causing the content to be communicated, from a local content resource to the mobile data client;
  communicating a receipt acknowledgement towards the remote server in respect of the content communicated from the local content resource to the mobile data client, after receipt thereof was acknowledged by the mobile data client;
  communicating an indication towards a core agent that content associated with a certain TCP link between the remote server and the mobile data client is communicated to the mobile data client from a local content resource; and
  in response to detecting a handoff of the mobile data client or loss of connection between the network appliance and the mobile data client, communicating an indication towards the core agent of the handoff or the loss of connection.

38. The method according to claim 37, wherein said communicating the content or causing the content to be communicated from a local content resource to the mobile data client, further comprises emulating a TCP connection between the remote server and the mobile data client.

39. The appliance according to claim 37, wherein determining which content is, or is to be, communicated by the remote server to the mobile data client further comprises determining if the content is available on a local content source, and obtaining the content from the local content source.

* * * * *